United States Patent
Levit-Gurevich et al.

(10) Patent No.: US 12,450,062 B2
(45) Date of Patent: Oct. 21, 2025

(54) DETERMINISTIC REPLAY OF A MULTI-THREADED TRACE ON A MULTI-THREADED PROCESSOR

(71) Applicant: Intel Corporation, Santa Clara, CA (US)

(72) Inventors: Konstantin Levit-Gurevich, Kiryat Byalik (IL); Alexander Skaletsky, Netanya (IL)

(73) Assignee: INTEL CORPORATION, Santa Clara, CA (US)

( * ) Notice: Subject to any disclaimer, the term of this patent is extended or adjusted under 35 U.S.C. 154(b) by 725 days.

(21) Appl. No.: 17/547,765

(22) Filed: Dec. 10, 2021

(65) Prior Publication Data

US 2022/0100512 A1 Mar. 31, 2022

(51) Int. Cl.
*G06F 9/30* (2018.01)
*G06F 11/362* (2025.01)
*G06T 1/20* (2006.01)

(52) U.S. Cl.
CPC ...... *G06F 9/30087* (2013.01); *G06F 11/3632* (2013.01); *G06F 11/3636* (2013.01); *G06F 11/3648* (2013.01); *G06T 1/20* (2013.01)

(58) Field of Classification Search
CPC ............. G06F 9/30087; G06F 11/3632; G06F 11/3636; G06F 11/3648; G06T 1/20
See application file for complete search history.

(56) References Cited

U.S. PATENT DOCUMENTS

| | | | |
|---|---|---|---|
| 9,898,385 B1* | 2/2018 | O'Dowd | G06F 11/3644 |
| 10,963,367 B2* | 3/2021 | Mola | G06F 11/3698 |
| 11,281,562 B2* | 3/2022 | Fahim | G06F 11/3485 |
| 2016/0179714 A1 | 6/2016 | Acharya | |

(Continued)

FOREIGN PATENT DOCUMENTS

| | | |
|---|---|---|
| CN | 117546139 A | 2/2024 |
| EP | 4445253 A1 | 10/2024 |

(Continued)

OTHER PUBLICATIONS

Non-Final Office Action issued in U.S. Appl. No. 18/064,225, mailed Sep. 19, 2024, 11 pages.

(Continued)

*Primary Examiner* — Corey S Faherty
(74) *Attorney, Agent, or Firm* — JAFFERY WATSON HAMILTON & DESANCTIS LLP

(57) ABSTRACT

A deterministic replay of a multi-threaded trace on a multi-threaded processor is described. An example of a computer-readable storage medium includes instructions to cause at least one processor to receive graphics processing unit (GPU) program code for tracing, the program code including a plurality of instructions; analyze the plurality of instructions to identify instructions of the program code that are events requiring synchronization; instrument each of the identified events to generate instrumented program code; execute the instrumented program code on a plurality of hardware threads of the GPU to generate trace data; and emulate the trace data utilizing an emulator on a plurality of hardware traces of a central processing unit (CPU), including replaying the identified events according to an order of occurrence of the identified events.

20 Claims, 16 Drawing Sheets

(56) References Cited

U.S. PATENT DOCUMENTS

| | | | |
|---|---|---|---|
| 2017/0337145 A1 | 11/2017 | Rozas et al. | |
| 2018/0349119 A1 | 12/2018 | Zaidi | |
| 2019/0102860 A1 | 4/2019 | Koker | |
| 2020/0034276 A1 | 1/2020 | O'Dowd et al. | |
| 2020/0210315 A1* | 7/2020 | Fahim | G06F 11/1446 |
| 2021/0089429 A1 | 3/2021 | Mola | |
| 2021/0117202 A1* | 4/2021 | Levit-Gurevich | G06F 11/3632 |
| 2022/0100512 A1 | 3/2022 | Levit-Gurevich et al. | |

FOREIGN PATENT DOCUMENTS

| | | |
|---|---|---|
| IN | 202347085667 | 1/2024 |
| WO | 2023/107789 A1 | 6/2023 |

OTHER PUBLICATIONS

PCT International Search Report International Application No. PCT/US2022/079165, mailed Mar. 13, 2023, 4 pages.

Written Opinion of the International Searching Authority, International Application No. PCT/US2022/079165, mailed Mar. 13, 2023, 4 pages.

Cheng-Kung, et al., "Fast profiling framework and race detection for heterogeneous system", Journal of Systems Architecture, vol. 81, pp. 83-91, Nov. 2017.

Examination Report issued in IN Application No. 202347085667, mailed Aug. 4, 2025, 7 pages.

\* cited by examiner

CODE INSTRUMENTATION

| BBL | Original Code |
|---|---|
| BBL0 | ADD<br>MOV<br>...<br>SUB |
| BBL1 | L1: MAD<br>MAD<br>ADD<br>CMP<br>SEND.DC dst src0 src1<br>JMP |
| BBL2 | (f0.0) IF L2 |
| BBL3 | ADD<br>SUBB<br>SHL |
| BBL4 | L2: ENDIF |
| ... | . . . |
| BBLN | send.eot |

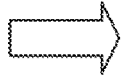

| BBL | Instrumented Code |
|---|---|
| BBL0 | ICOUNT = 0<br>TRACE(tid, ICOUNT, input payload)<br>ADD<br>MOV<br>...<br>SUB<br>ICOUNT += #Originstr(BBL0) |
| BBL1 | L1: MAD<br>MAD<br>ADD<br>CMP<br>SEND.DC dst src0 src1<br>TRACE(tid, ICOUNT+4, dst)<br>ICOUNT += #Originstr(BBL1)<br>JMP |
| BBL2 | ICOUNT += #Instr(BBL2)<br>(f0.0) IF L2 |
| BBL3 | ADD<br>SUBB<br>SHL<br>ICOUNT += #Instr(BBL3) |
| BBL4 | L2: ICOUNT += #Instr(BBL4)<br>ENDIF |
| ... | . . . |
| BBLN | TRACE(tid, ICOUNT)<br>send.eot |

FIG. 3

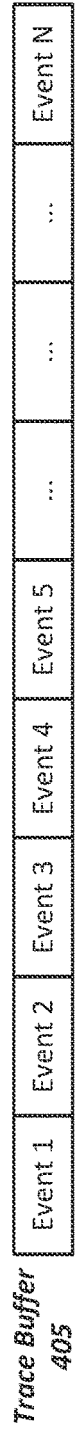
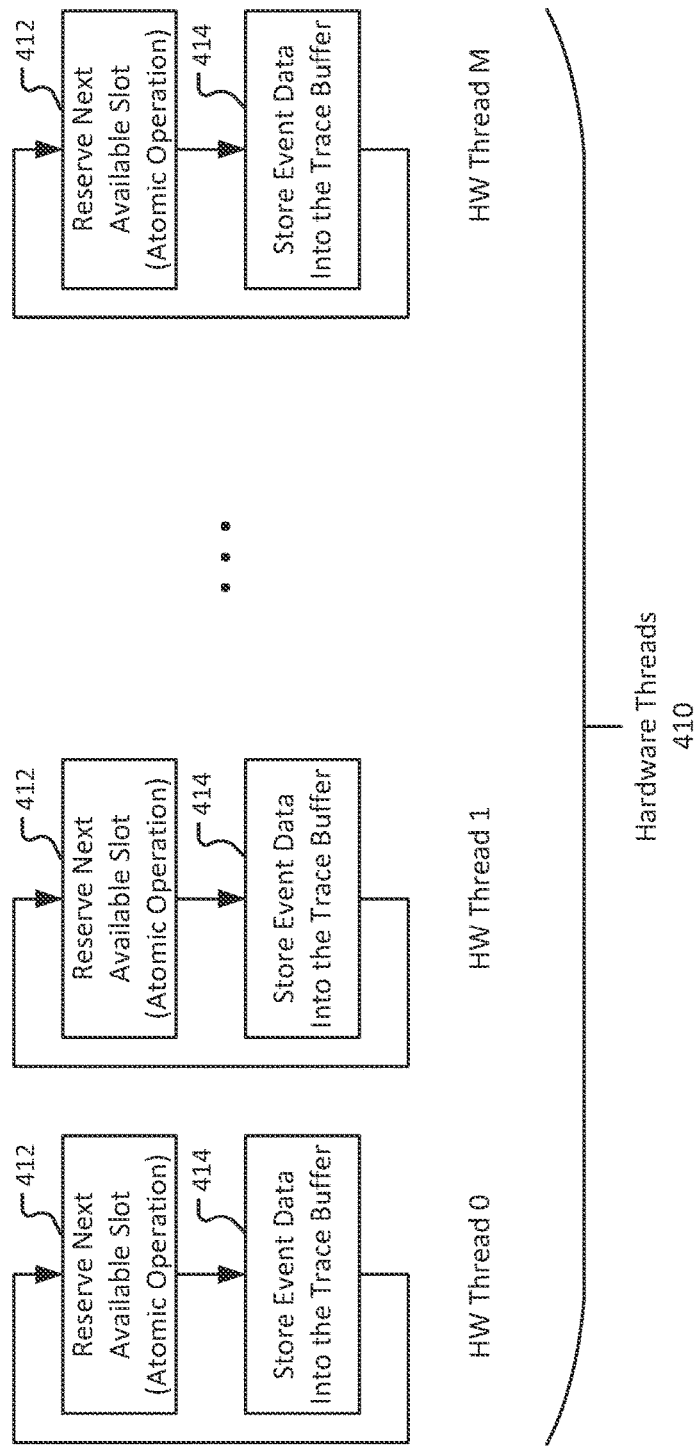
FIG. 4A

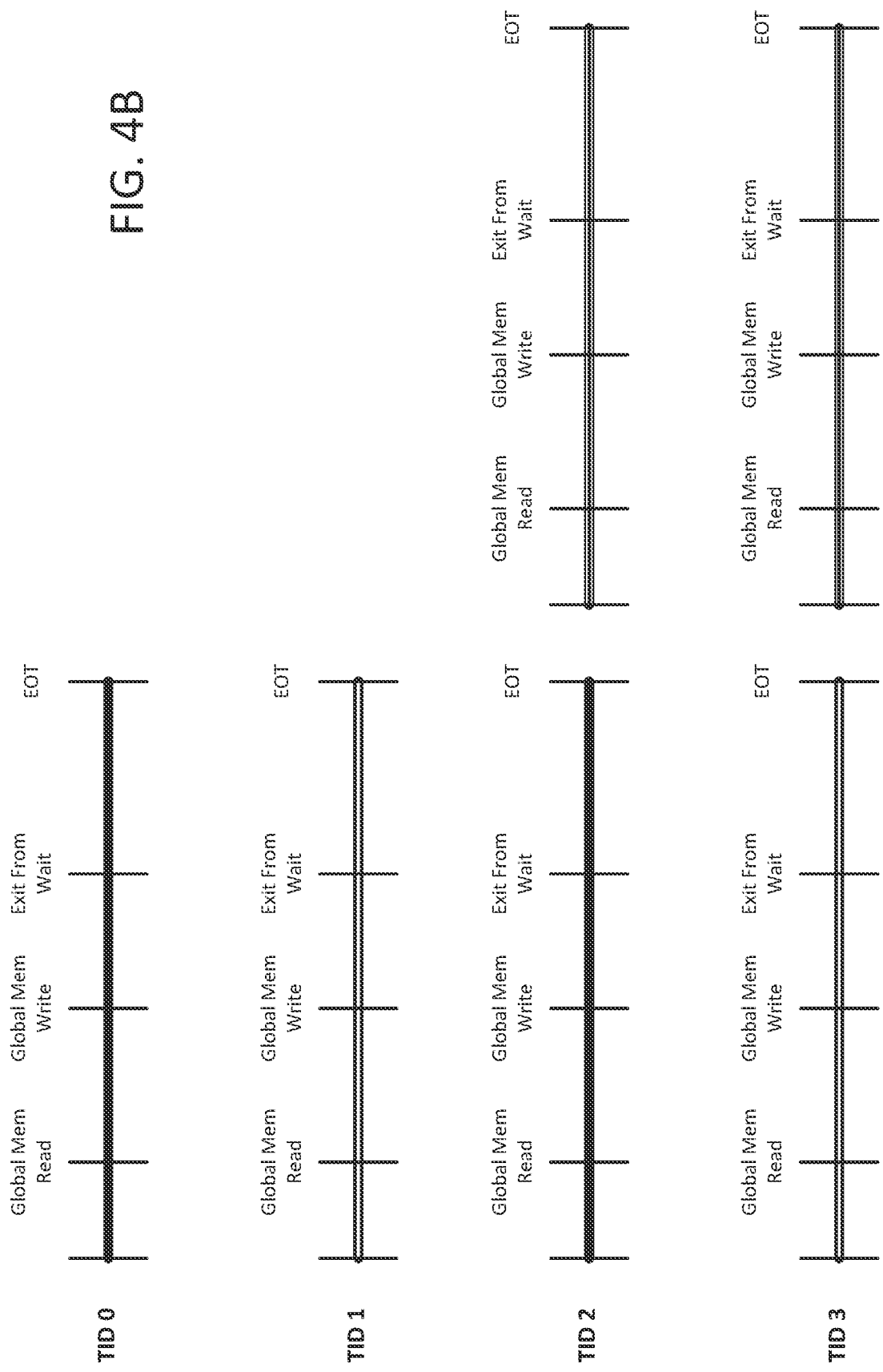

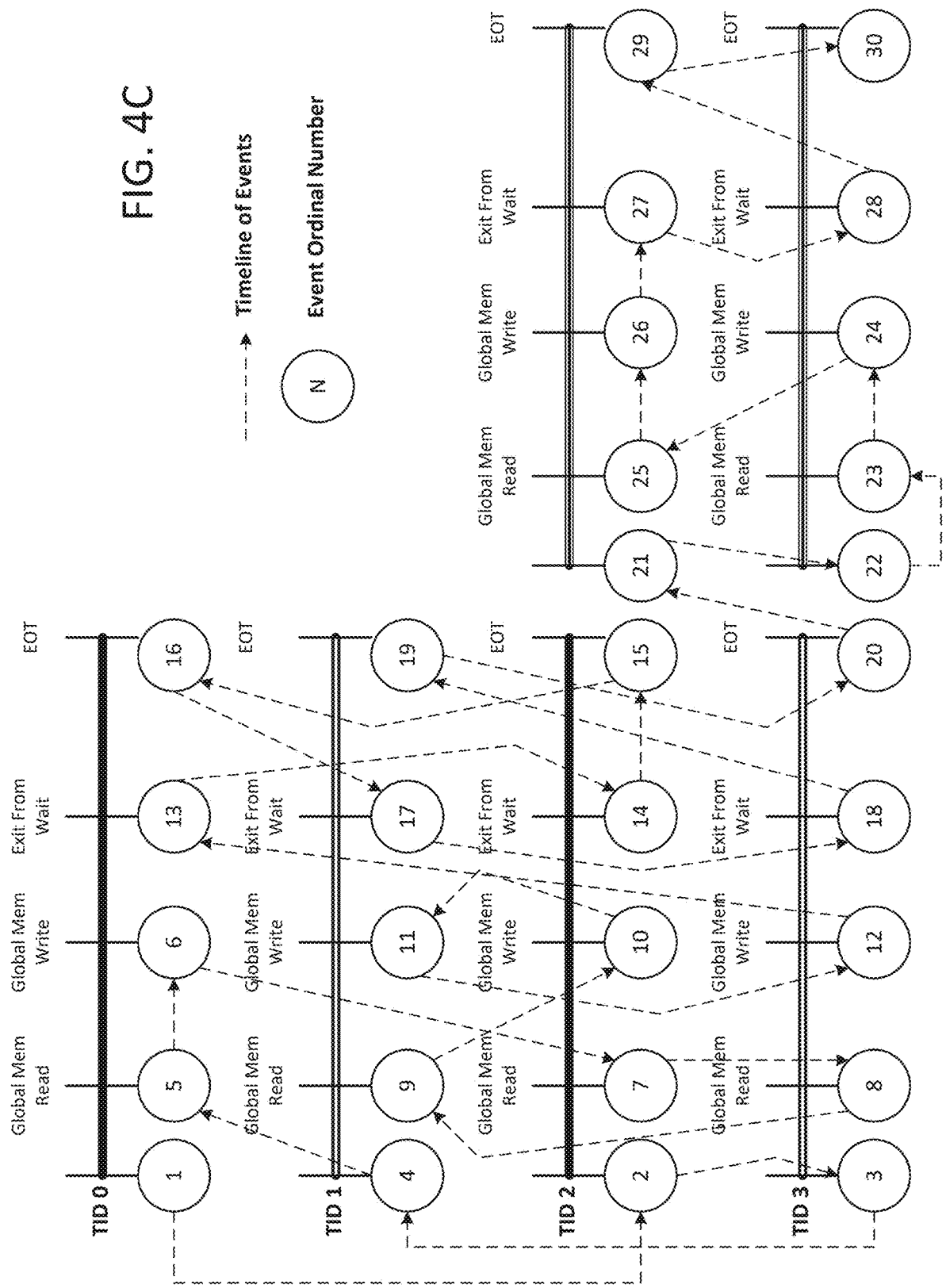

DETERMINISTIC REPLAY OF A MULTI-THREADED TRACE ON A MULTI-THREADED PROCESSOR

TECHNICAL FIELD

This disclosure generally relates to the field of computing devices and, more particularly, deterministic replay of a multi-threaded trace on a multi-threaded processor.

BACKGROUND

Workload profiling and analysis is a crucial task in computer software and hardware development processes. For central processing unit (CPU) operations, there numerous tools that allow for application profiling, tracing, replaying the traces for further analysis, debugging, tuning, and other examples.

In comparison, there are fewer profiling and analysis tools available for graphics processing units (GPUs). The factors that have limited the availability of effective tools include that a GPU is a separate environment and the code running on GPU does not have the benefit of expansive memory, OS (Operating System) support, and similar advantages of a CPU; and that a GPU is generally an extremely parallel device with potentially hundreds or thousands of software threads working in parallel, as compared to the handful of parallel threads in a CPU, thus complicating the profiling and analysis process.

BRIEF DESCRIPTION OF THE DRAWINGS

Embodiments described here are illustrated by way of example, and not by way of limitation, in the figures of the accompanying drawings in which like reference numerals refer to similar elements.

FIG. 3 is an illustration of instrumentation of code for deterministic replay of a multi-threaded trace on a multi-threaded processor, according to some embodiments;

FIG. 4A illustrates execution of instrumented code in generation of GPU traces, according to some embodiments;

FIG. 4B illustrates execution of a set of instrumented code for GPU tracing, according to some embodiments;

FIG. 4C illustrates execution of a set of instrumented code for GPU tracing, according to some embodiments;

DETAILED DESCRIPTION

Embodiments described herein are directed to deterministic replay of a multi-threaded trace on a multi-threaded processor.

Figure 11:
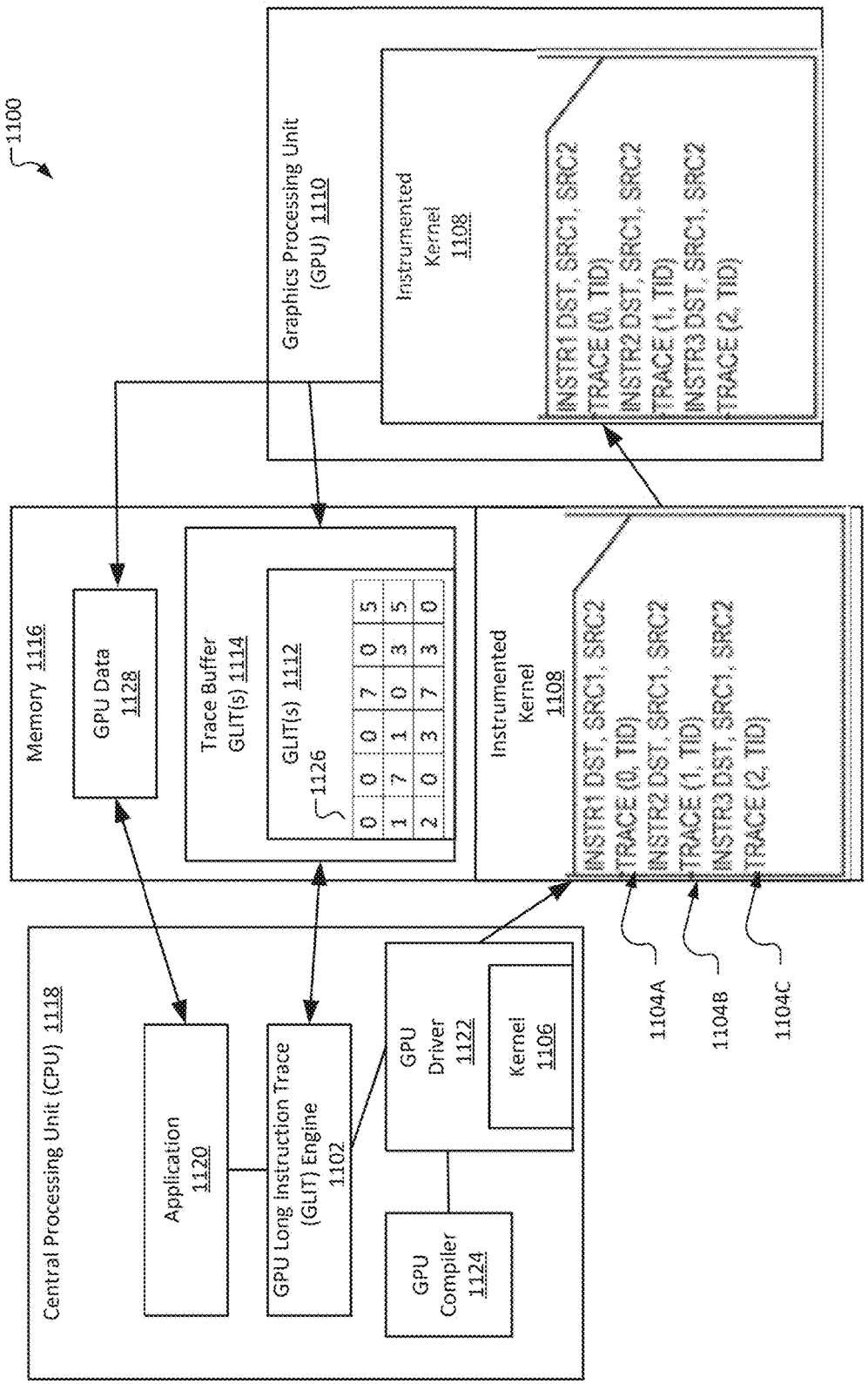
FIG. 11 is a block diagram illustrating an example graphics processing unit long instruction trace (GLIT) engine inserting profiling instructions into an example graphics processing unit (GPU) kernel to be executed by an example GPU.
Figure 12:
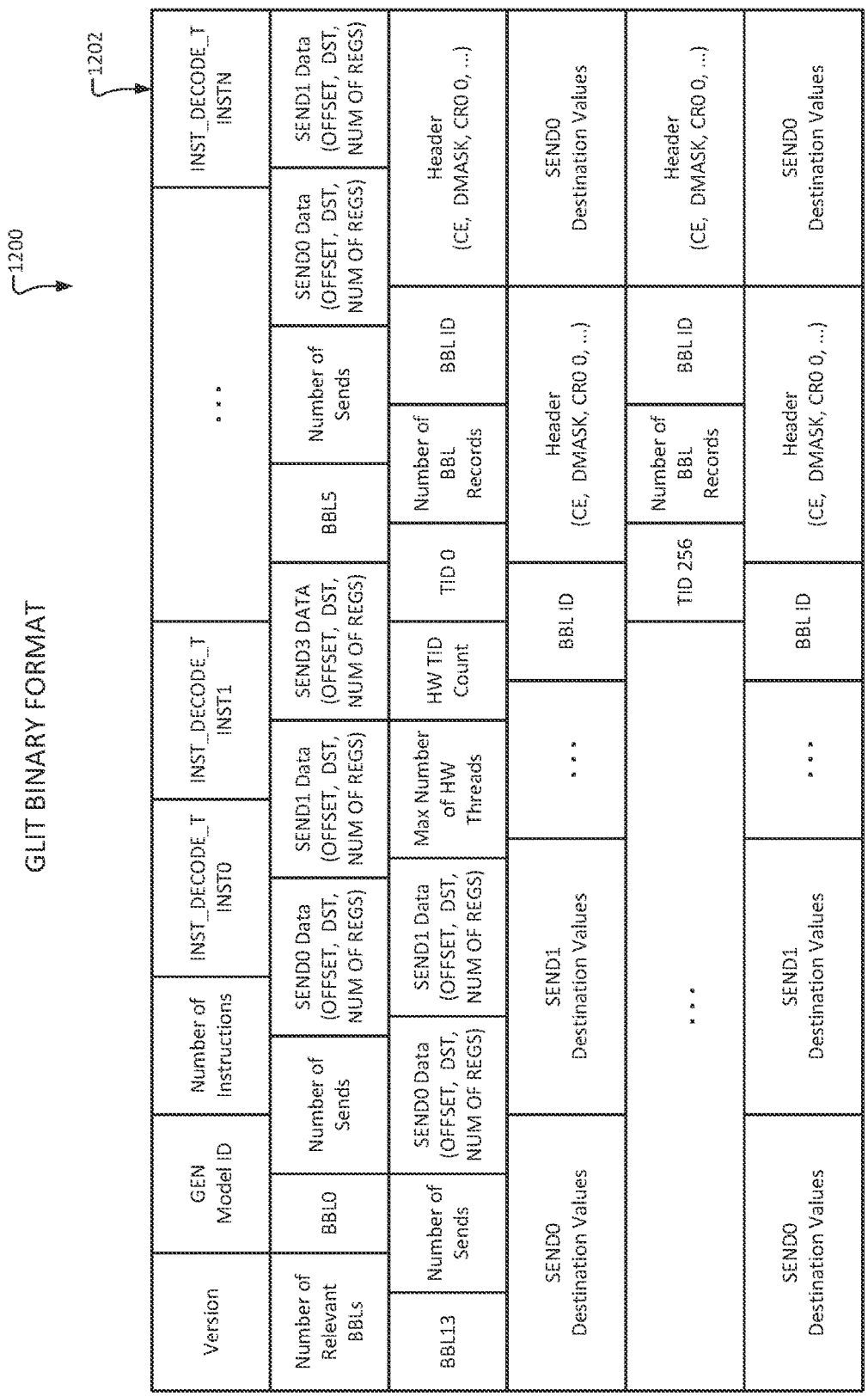
FIG. 12 depicts an example format of an example long instruction trace.
Figure 13:
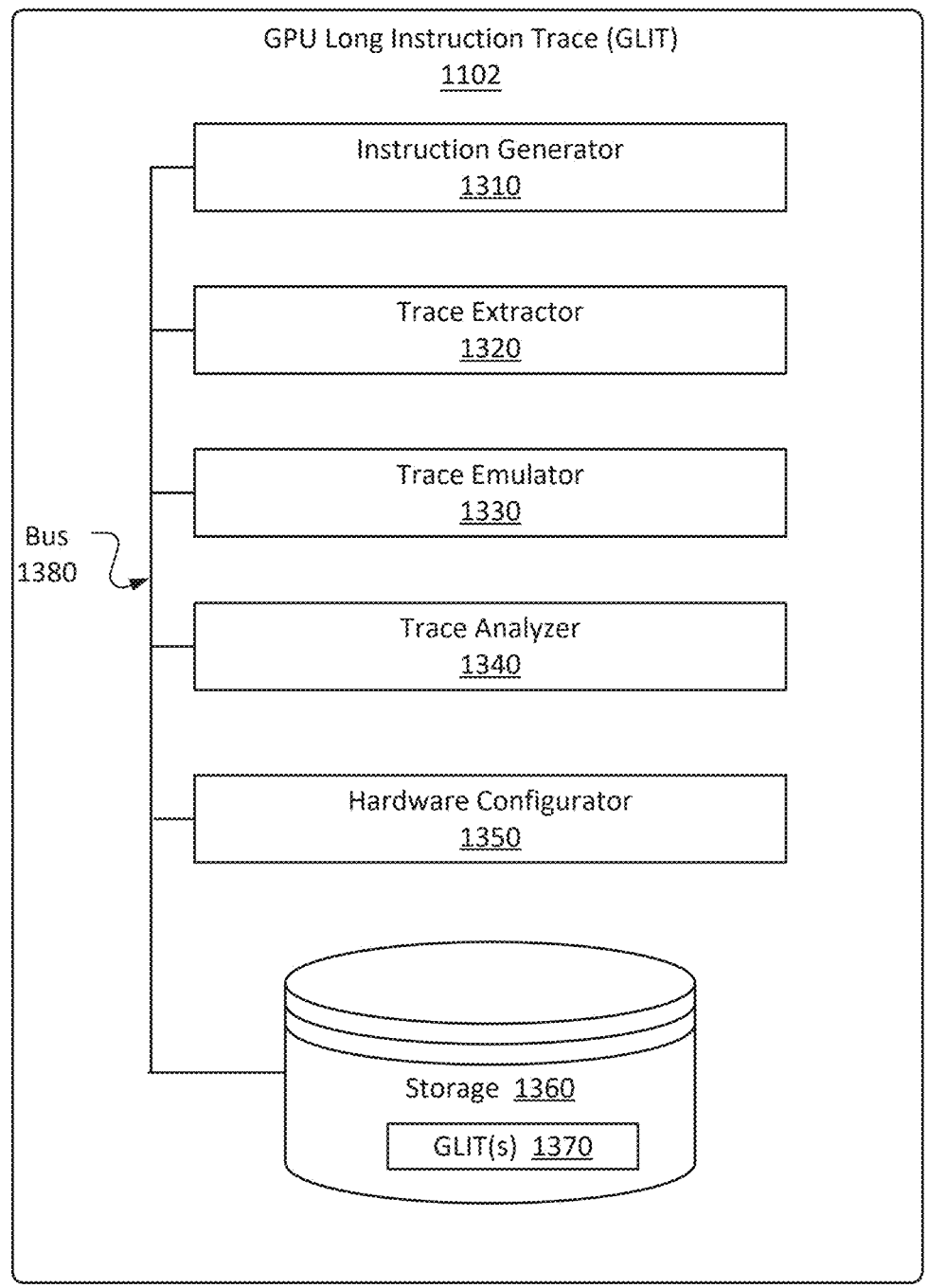
FIG. 13 is a block diagram of an example implementation of a GLIT engine.

In order to obtain a trace for a GPU device for analysis and application development, it is possible to generate a special self-contained trace (referred to as GLIT (Long Instruction Trace for GPU) trace) that is recorded on a GPU device. Further, a GTReplay (a fast functional emulator) may be applied to replay GLITs. Technology related to such a trace on a processor is illustrated in FIGS. 11-13, as presented in U.S. patent application Ser. No. 17/111,136.

As described with relation to FIGS. 11-13, a GLIT trace is a multi-threaded trace containing traces for each dispatch of a binary kernel or shader on any processing resource (such as an execution unit (EU) of a GPU, where each such dispatch may be referred to as a guest software (SW) thread. An application and/or a runtime can group several SW threads into a group of threads (for example, a particular architecture may support thread groups including up to 32 SW threads) operating on the same subset of data as defined by the application. In operation, the software threads within the same thread group generally share the same hardware (HW) resources and use different synchronization elements for synchronization.

As used herein, an "Event" refers to an instruction in which synchronization is required. A particular replaying software (for example, GTReplay or other simulator or emulator) for use in replaying threads for analysis and application development may be either single-threaded or multithreaded, where the guest software threads are emulated in parallel. In both cases, in order to maintain the correctness of the replay and its deterministic manner, it is necessary that the Events that have occurred (where identified Events may include memory accesses, inter-thread synchronization Events, cache flushes, and others) on GPU device be replayed in a same order as the Events were recorded. For a GPU device that is highly multi-threaded, where hundreds or thousands of threads may be running in parallel, the problem of deterministic replay of a GPU trace (such as a GLIT trace) is extremely difficult and generally requires the design of special mechanisms to provide a solution.

In some embodiments, an operation to provide method to replay GLIT traces, collected on GPU device, in a deterministic manner on an emulator running on CPU, regardless of the number of CPU threads. The deterministic replay allows the users to profile and analyze the kernel or shader correctly, and thus allows detecting hardware and software problems faster.

In some embodiments, an apparatus, system, or process operates to enhance the generation and analysis usage of GPU traces by allowing for efficient synchronization and determinism of replay of such traces. In some embodiments, an apparatus, system, or process provides for replaying and profiling such a trace on a CPU device, thus enabling a robust and flexible operation for profiling and analysis of GPU code by moving the profiling from the GPU domain into the CPU domain, and thus removing the obstacles of memory and OS support limitations in trace replay. The replay and analysis of GPU traces may be provided with relatively low overhead, and without use of memory-resident data (as all necessary information may be held in registers) or requiring thread synchronization during trace logging; and accurately simulates read-after-write and all serialization dependencies in the original application code.

Possible usages for an embodiment include, but are not limited to, functional profiling and analysis of GPU code, which can be performed on-the-fly; developing analysis tools of any complexity for GPU code; developing models for circuitry elements including memory, caches, and other; debugging kernels; software validation and inspection, including detection of memory races in operation; and others.

Figure 1:
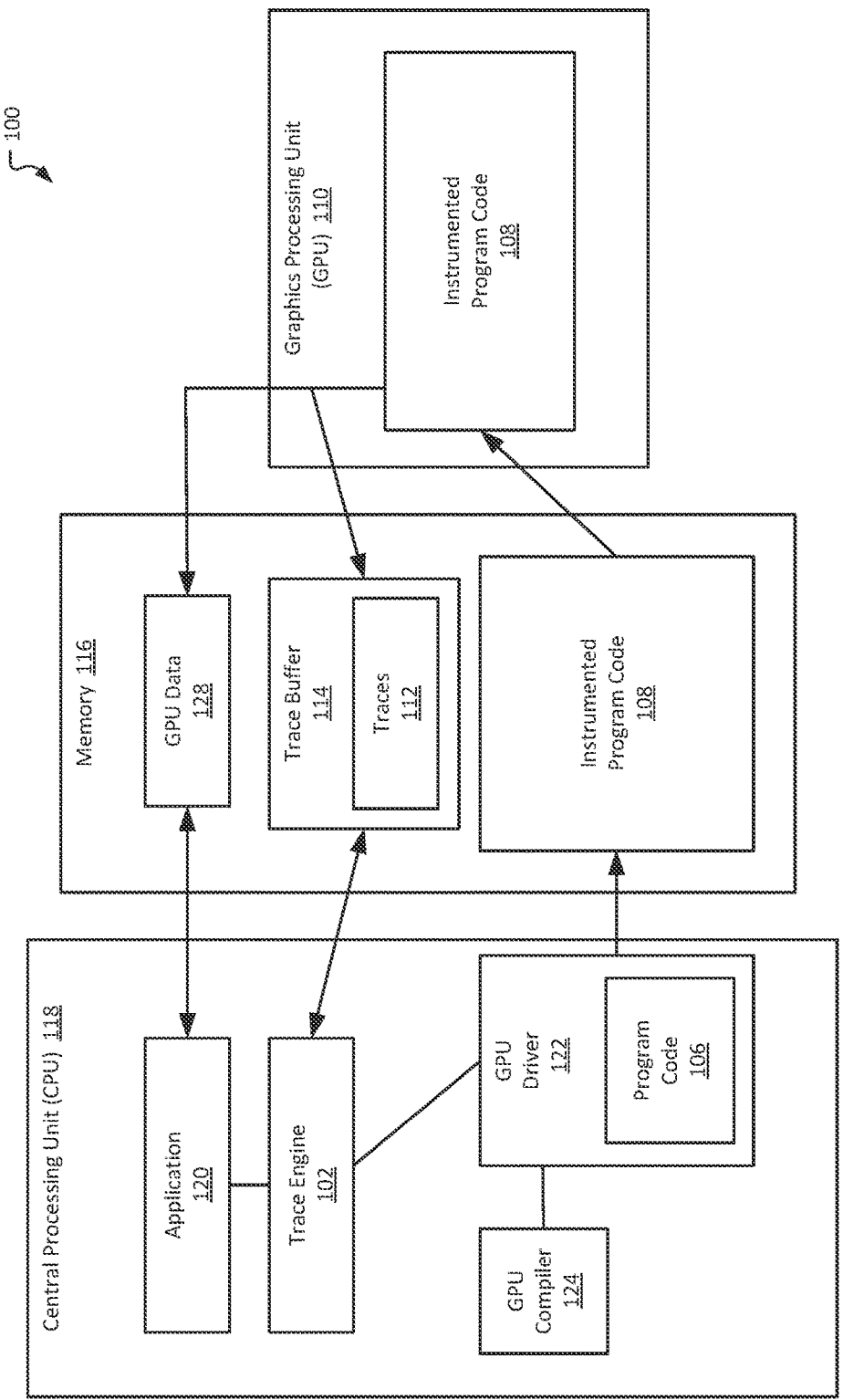
FIG. 1 is an illustration of deterministic replay of a multi-threaded trace on a multi-threaded processor, according to some embodiments.

FIG. 1 is an illustration of deterministic replay of a multi-threaded trace on a multi-threaded processor, according to some embodiments. In some embodiments, a host system 100 includes a central processing unit (CPU) 118, a memory 116, and a graphics processing unit (GPU) 110. Other elements may be, for example, as illustrated in the computing architecture 700 in FIG. 7.

The number of hardware threads that are available on a GPU device, such as GPU device 110, is generally much larger than the number of hardware threads that are available on a CPU device, such as CPU 118. A replay emulator is to leverage the underlying multi-processor/multi-threaded platform to speed-up the replay, and thus the timing of the "GPU Events" might differ from one replay session to another dependent on the number of software threads the replay emulator uses. As a result, the profiling of the program code 106 can achieve different results at different times.

In some embodiments, an operation enables GPU Events to be processed in sync with each other. The operation includes determining an order of the GPU Events during the creation of the GPU trace 112, and provides deterministic replay of the GPU trace 112 on the CPU 118 regardless of configuration. In some embodiments, GPU traces (including GLIT traces) 112 are generated on the GPU device 110 and the traces are then replayed on the CPU device 118 in such a manner that the order of the GPU Events, as the Events were recorded, is maintained in replay.

A GPU device 110 includes many processing resources (such as Execution Units (EUs)). In a particular example each processing resource is a symmetric multithreaded processor having 8 hardware threads. Each hardware thread within the topology of the GPU device has its own identification, where TID (Thread ID) refers to an identification for a single hardware thread. Overall, a GPU device may contain hundreds or thousands of hardware threads.

In operation, a kernel or shader is a program that an application wants to send for execution to a GPU device. The program code 106 is referred to as a shader in terms of graphics operations, or as a kernel in terms of GPGPU (General Purpose GPU) operations. The GPU hardware dispatches (or spreads) instances of program code to available processing resources and hardware threads, such that hundreds or thousands of instances of the same program code are running in parallel on the GPU device and each instance of the program code processes a subset of data as intended by the application. Each instance of program code consists of a finite number of instructions. The last instruction of each instance of program code is a SEND instruction, a so called EOT (End-Of-Thread) instruction. This instruction notifies the hardware that the program code instance that is running on the current hardware thread is finished, and from this point the hardware thread is in an idle state, and thus another program code instance can be dispatched to this hardware thread. As described herein, a single program code instance dispatched to a hardware thread may be denoted as a "job" or a "software thread".

A Basic Block (BBL) is a continuous subsequence of ISA (Instruction Set Architecture) instructions having single entry point and single exit point. Each time execution accesses a basic block it is assured that all the instructions contained within this BBL are executed exactly once. From this definition it follows that a control flow instruction might be the first or the last instruction of a basic block, or its only instruction.

Figure 2:
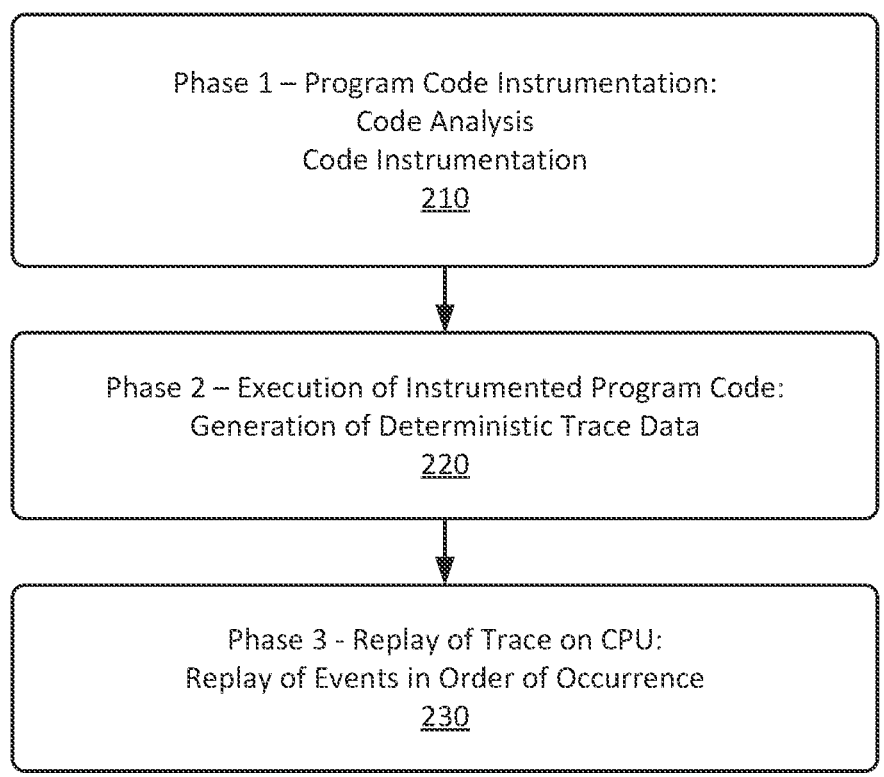
FIG. 2 is an illustration of phases of a process for deterministic replay of a multi-threaded trace on a multi-threaded processor, according to some embodiments.

FIG. 2 is an illustration of phases of a process for deterministic replay of a multi-threaded trace on a multi-threaded processor, according to some embodiments. In some embodiments, an operation for deterministic replay of a multi-threaded trace on a multi-threaded processor 200 may include three phases:

Phase 1: Program Code Instrumentation 210 (as illustrated in FIG. 3)–I=n some embodiments, performing program code instrumentation includes:

(1) Code Analysis—Operations include analyzing the original program code, including identifying instructions that are Events requiring replay in a specified order in relation to other Events that are observed and traced during the code execution on the GPU device. Identified Events may include, but are not limited to:
(a) Code dispatch
(b) Code End-of-thread (EOT) Events
(c) Read/write accesses to global memory
(d) Read/write accesses to shared local memory
(e) Exits from waiting state (the next instruction after WAIT or SYNC.BAR instructions)
(f) Memory fence (memory barrier) instruction (instruction relating to enforcing an ordering constraint on memory operations issued before and after the memory fence instruction)
(2) Program Code Instrumentation—Instruction Counting and Tracing—In some embodiments, the instructions that were identified as Events during the code analysis are instrumented for purposes of providing a deterministic trace. Instrumentation refers to a process of inserting one or more instructions to support monitoring of code execution.

Phase 2: Execution of the Instrumented Program Code 220 (as illustrated in FIGS. 4A-4C)—The instrumented code of the program is executed on the GPU to generate deterministic trace data.

Phase 3: Replay of the Trace on CPU 230 (as illustrated in FIG. 5B)—The trace data generated with the instrumented code may then be replayed for analysis on the CPU, including replaying identified Events in order of occurrence.

FIG. 3 is an illustration of instrumentation of code for deterministic replay of a multi-threaded trace on a multi-threaded host, according to some embodiments. FIG. 3 illustrates overall instrumentation of code, wherein original code 300 (referring to kernel or shader program code before an instrumentation operation is performed) is modified to produce a set of instrumented code 350 for generation of a trace.

In some embodiments, an operation includes analysis of the original code 300 to identify event locations where synchronization is required, wherein the event locations may include memory accesses, memory fence instructions, exits from a waiting state, and other locations needing synchronization, as further described above. In the original code, the underlined portions of the original code 300 are the instructions that have been identified as requiring synchronization (i.e., identified as Events), with the added instrumentation in relation to the identified events for tracing being indicated in bold type in the instrumented code 350.

Each record that is saved within a trace is associated with two numbers, the hardware thread ID (TID) where the record is generated and the "ICOUNT". The ICOUNT is the value of the dynamic instruction count of the original instruction where tracing instrumentation was added, as measured from the beginning of the current software thread. To compute the current value of the dynamic ICOUNT within the program code the following approach may be applied:

Divide the program code into a sequence of basic blocks (BBLs), each BBL consisting of one or more instructions. As illustrated in FIG. 3, the binary code has been divided into basic blocks BBL0, BBL1, BBL2, BBL3, BBL4, and continuing through BBLN. with each basic block including one or more instructions.

From the BBL definition, it follows that, if the dynamic ICOUNT of the first instruction of the basic block is M, then the dynamic ICOUNT of the instruction k within this BBL is M+k (k=0, 1, 2, . . . ).

An ICOUNT variable is allocated and may be initialized to zero before the first instruction of the original code, and before any tracing operation is performed. If the last instruction of the current BBL is a non-control-flow instruction, then an increment of the ICOUNT variable by the amount of the original instruction is inserted within this basic block (ICOUNT+=#OriginalInstructions(BBL)) immediately after the last instruction of the BBL. If the last instruction of the basic block is a control-flow instruction, then such an instrumentation is inserted immediately before the last instruction of the BBL. As example of the ICOUNT instrumentation is illustrated in FIG. 3 in the instrumented code 350.

Thus, in the example provided in FIG. 3, the original code 300 at the left represents an original kernel or shader, in which there are certain points (which are italicized) that are identified as Events to be instrumented. Specifically, a process is to save data before the first instruction (ADD) of the code (code dispatch point), before the last instruction (SEND.EOT) of the code (end-of-thread Event), and after the SEND instruction within BBL1 (read access to global memory). Each time a trace operation is performed a value of ICOUNT+instruction ID within the corresponding basic block is computed and saved. The instruction ID within the basic block is static information and it is known during the instrumentation process. It is noted that, in order to ensure correct replay of read-after-write dependencies, trace records are logged before write instructions and are logged after read instructions.

In this manner, locations within the program code are instrumented to enable collection of a trace such that the native order of the Events happening on the GPU can be reconstructed; a dynamic instruction counter is maintained for each software thread to identify locations within the software threads; and each record within the trace is associated with a current value of the dynamic instruction count (ICOUNT) and the current hardware thread ID (TID).

FIG. 4A illustrates execution of instrumented code in generation of GPU traces, according to some embodiments. In some embodiments, execution of instrumented code (such as instrumented code 350 as illustrated in FIG. 3) enables a trace is to be generated such that records that correspond to Events occurring earlier in processing will precede records that correspond to Events occurring later in the processing.

As shown in FIG. 4A, a trace buffer 405 provides storage for a set of Events. As indicated in FIG. 4A:

$$\text{time}(\text{Event}_I) < \text{time}(\text{Event}_J) \leftrightarrow \text{for all } I, K=1, \ldots, N \quad [1]$$

In the execution of the program code, many binary instances are running in parallel on many processing resources (such as EUs) and hardware threads 410 (shown as HW Thread 0 through HW Thread M in FIG. 4A). When the code execution reaches a point where a trace record is ready to be stored within the trace buffer 405, an atomic reservation of the next available slot(s) within the trace buffer is performed 412, and, once reserved, the data is stored in the reserved slot of the trace buffer 414. The atomicity of the reservation ensures that for any two Events I and K (I, K=1, . . . , N, where N denotes the total number of the traced Events) the time of the Event I (time(EventI)) is less than the time of the Event K (time(EventK)) if and only if I<K.).

FIG. 4B illustrates execution of a set of instrumented code for GPU tracing, according to some embodiments. FIG. 4B illustrates a hypothetical run of a program code instance on a machine having four hardware threads (denoted as TID 0, TID 1, TID 2, and TID 3). In this simplified example, it is assumed that the application and the runtime create three thread groups, with two software threads in each thread group. In an actual run, the numbers of thread groups and threads may be much greater.

In the illustration in FIG. 4B, each thread group is denoted by a different horizontal line pattern, with a first thread group indicated by a single line, a second thread group indicated by a double line, and a third thread group indicated by a triple line. The vertical bars denote the points where the tracing instrumentations were executed. The instrumentation technique, such as illustrated in FIG. 3, produces a trace where the order of the recorded Events (i.e., the "timeline" of the Events) may be as presented In FIG. 4C.

FIG. 4C illustrates execution of a set of instrumented code for GPU tracing, according to some embodiments. In a run of thread execution in a GPU, the actual occurrence times may vary depending on numerous factors based on the code and the processing hardware that is executing such code. As provided in FIG. 4C, each Event occurring in the three thread groups as executed in the four hardware threads (TID 0, TID 1, TID 2, and TID 3) may be identified with an Event ordinal number to indicate the order in which the Events occurred.

For example, as shown in FIG. 4C the initial thread operation in TID 0 occurs first, followed by the initial thread operations in TID 2, TID 3, and TID 1. From this point, the next Event is a global memory read in TID 0, a global memory write in TID 0, a global memory read in TID 2, and continuing through the Events executed on each of the hardware threads. This series of Events makes up the timeline for a trace of the run of the code.

Figure 5A:
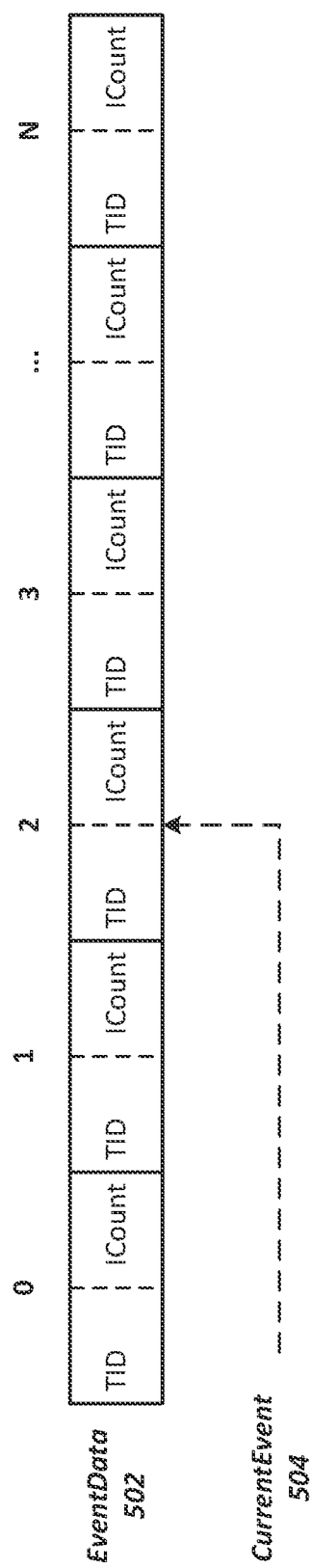
FIGS. 5A and 5B illustrate deterministic replay of GPU traces on a CPU, according to some embodiments.
Figure 5B:
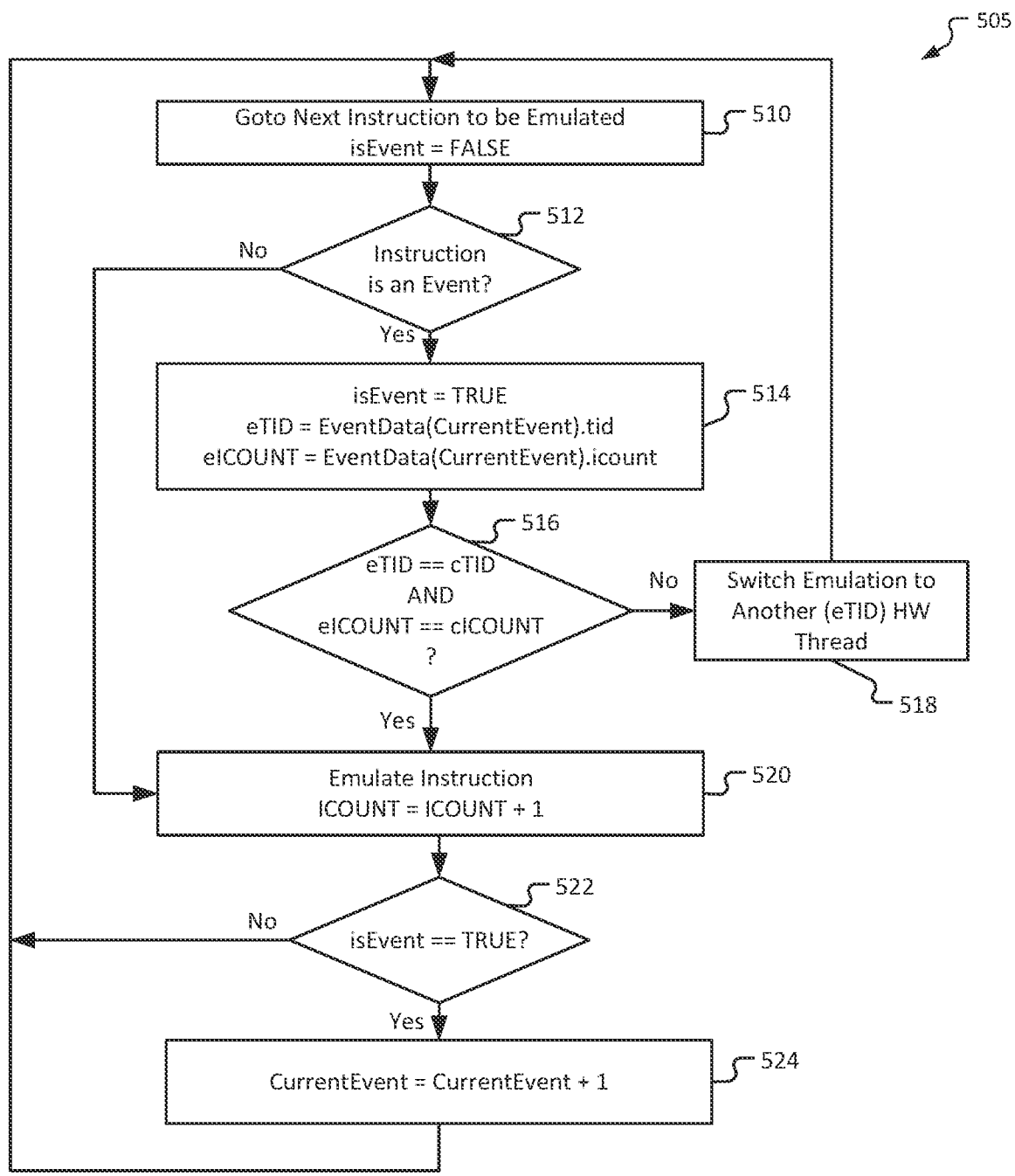

FIGS. 5A and 5B illustrate deterministic replay of GPU traces on a CPU, according to some embodiments. Upon generating instrumented code (e.g., as illustrated in FIG. 3) and generating a trace (such as a GLIT trace, e.g., as illustrated in FIGS. 4A-4C) based on the instrumented code, a trace is replayed on an emulator running on CPU device (such as an emulator running on CPU 118 illustrated in FIG. 1). In an operation, the resulting trace contains N number of GPU software threads (wherein N equals six in the simplified example illustrated in FIGS. 4B and 4C), and the GPU software traces are to be replayed on M number of CPU software threads (which may be 1 or 2 in the example). In most cases, N is much greater than M.

If N number of software threads are replayed independently, the results of the emulation may change depending on the configuration of the host machine and the amount of CPU software threads that are utilized in the replay operation. In some embodiments, to maintain correctness of the replay execution, and its determinism regardless of the host configuration, the traces are replayed such that the recorded Events (as these occurred on the GPU) are replayed in the same order as they occurred, such that the Events that happened earlier on GPU will precede the Events that happened later also during the replay.

FIGS. 5A and 5B illustrate processes for an embodiment in which a GPU device includes numerous processing resources (such as EUs), each of which is a symmetric multithreaded processor having, for example, eight hardware threads. Each hardware thread within the topology of the GPU device has its own identification. Overall, a GPU device may contain hundreds or thousands of hardware threads.

As shown in FIG. 5A:

EventData 502: Each Event includes EventData, with the EventData for each Event including an index value. The EventData may include the data for events stored in the trace buffer 405 as illustrated in FIG. 4A. The set of EventData for the identified Events represents a timeline of the Events as recorded within the trace according to the index value for each Event. In this example, the Events are Event 0 through Event N (i.e., index values 0 through N), with the EventData for each Event including a thread ID (TID) and a dynamic instruction count (ICOUNT). Within the EventData timeline, a lower index value indicates an earlier Event. The timeline may be, for example, the timeline of Events from multiple software threads executed on multiple hardware threads as shown in FIG. 4C.

CurrentEvent 504: The CurrentEvent is a pointer to the next not-yet-executed Event within the timeline of the Events. In this illustration, the CurrentEvent is pointing to Event 2. The CurrentEvent may be indexed into an array, and initialized to zero in a particular operation.

FIG. 5B illustrates a process 505 for the replay of GPU Events in an emulator on a CPU. In the process, the following terms are used:

cTID: The cTID (current TID) refers to the TID of the currently emulated hardware thread.

cICOUNT: The cICOUNT (current ICOUNT) refers to the dynamic instruction count of the current software thread (i.e., the software thread being executed on the current TID) from the beginning of this software thread.

eTID—The eTID (Event TID) refers to the TID of the next timeline Event appearing within the trace, as pointed to by CurrentEvent.

eICOUNT—The eICOUNT refers to the dynamic instruction count of the next timeline Event appearing within the trace, as pointed to by CurrentEvent.

In some embodiments, a process 505 for a CPU software thread performing replay of a trace includes the following:

After going to the next instruction to be emulated 510, a determination is made whether the instruction is or is not an Event 512. If the instruction is not an Event, then the instruction is emulated, and the ICOUNT is incremented (ICOUNT=ICOUNT+1) 520. The process then will proceed to the next instruction of the program code—the determination of isEvent=TRUE 522 is negative, and the process thus proceeds to the next instruction to be emulated 510.

If the determination is that the instruction is an Event 512, then eTID is equal to the TID from the EventData of the CurrentEvent, and eICOUNT is equal to the ICOUNT from the EventData of the CurrentEvent 514. There is then a determination whether the current eTID and eICOUNT values from the EventData match the currently emulated hardware thread (cTID) and the current GPU software thread instruction count (cICOUNT) 516. If there is not a match, then the emulation is switched to another GPU hardware thread 518, and the process 505 proceeds to the next instruction to be emulated 510.

If there is a match, then the instruction is emulated, and the ICOUNT is incremented 520. The determination of isEvent=TRUE 522 is positive, and the process thus increments the CurrentEvent (CurrentEvent=CurrentEvent+1) 524, proceeds to the next instruction to be emulated 510.

Figure 6:
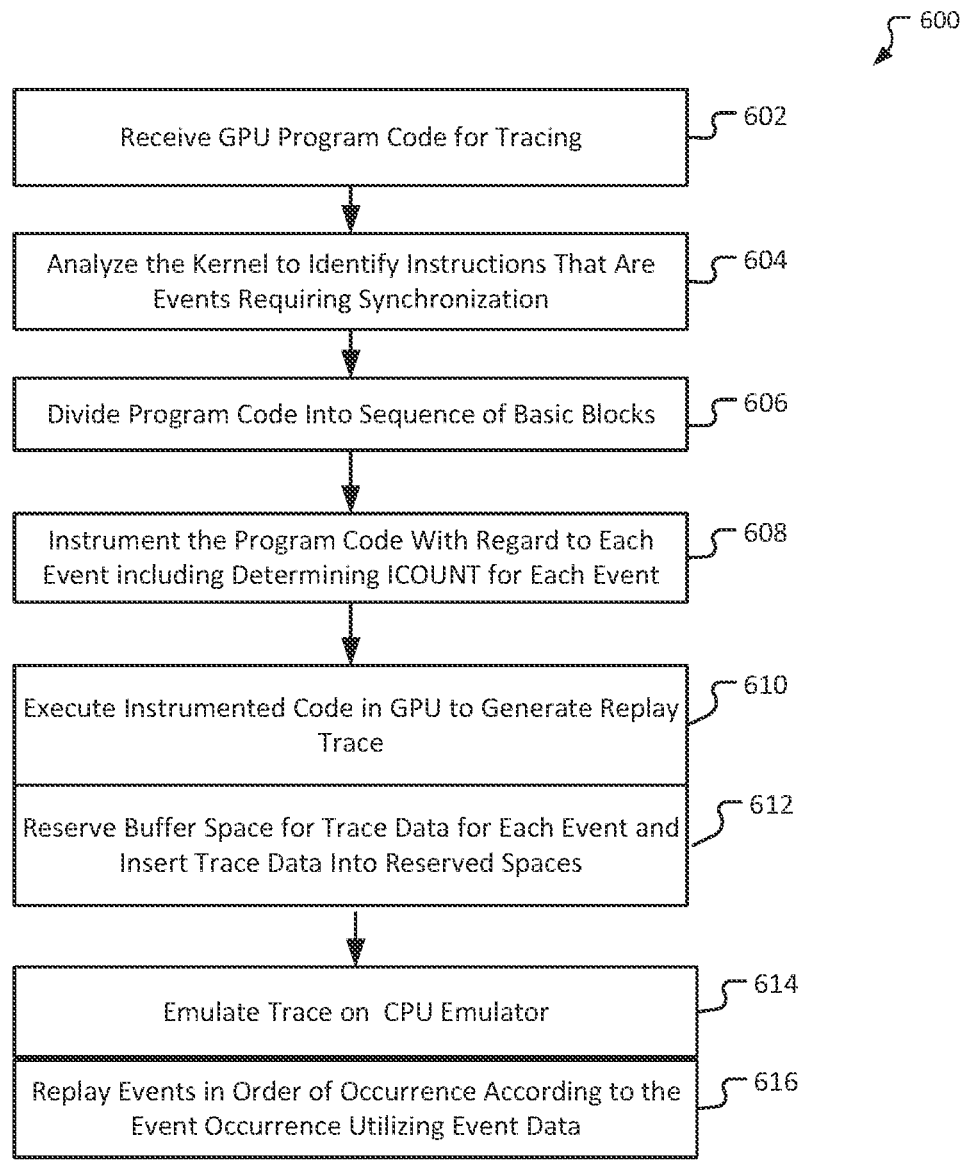
FIG. 6 is a flowchart to illustrate a process for deterministic replay of a multi-threaded trace on a multi-threaded processor, according to some examples.

FIG. 6 is a flowchart to illustrate a process for deterministic replay of a multi-threaded trace on a multi-threaded host, according to some examples. In a process 600, GPU program code is received for tracing 602, where the program code may be a kernel or shader. In some embodiments, the program code is analyzed to identify instructions that are Events requiring synchronization 604, where the Events may include, but are not limited to, code dispatches, code end-of-thread (EOT) Events, read/write accesses to global memory, read/write accesses to shared local memory, exits from waiting states, or memory fence (barrier) instructions.

The process 600 continues with dividing the program code into basic blocks (BBLs) 606, such as shown in the original code 300 in FIG. 3. In some embodiments, the program code is instrumented with regard to each identified Event (such as illustrated in the instrumented code 350 in FIG. 3), including determining an ICOUNT value for each Event 608.

The instrumented program code is then executed on each of M hardware threads of the GPU to generate Trace data 610. The execution of the program code includes, upon reaching an Event in the program code at a hardware thread, reserving a next available slot of a trace buffer and inserting Event data into the reserved slot 612, such as illustrated in FIG. 4A.

In some embodiments, the process 600 then proceeds with emulating the instructions of the trace data utilizing an emulator on a CPU 614, including replaying Events according to the order of occurrence of the Events utilizing the stored Event data 616. For example, the data may be the EventData 502, with the next event pointed to by the CurrentEvent pointer 504, as illustrated in FIG. 5A, with the instructions being emulated according to the process 505 illustrated in FIG. 5B.

The flowchart illustrated in FIG. 6, and other processes described herein, may include machine readable instructions for a program for execution by processor circuitry. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

A program may be embodied in software stored on one or more non-transitory computer readable storage media such as a CD or DVD, a hard disk drive (HDD), a solid state drive (SSD), a volatile memory (e.g., Random Access Memory (RAM) of any type, etc.), or a non-volatile memory (e.g., FLASH memory, an HDD, etc.) associated with processor circuitry located in one or more hardware devices. The program or parts thereof may alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Although the example program is described with reference to the flowchart illustrated in FIG. 6, many other methods of implementing may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

Figure 7:
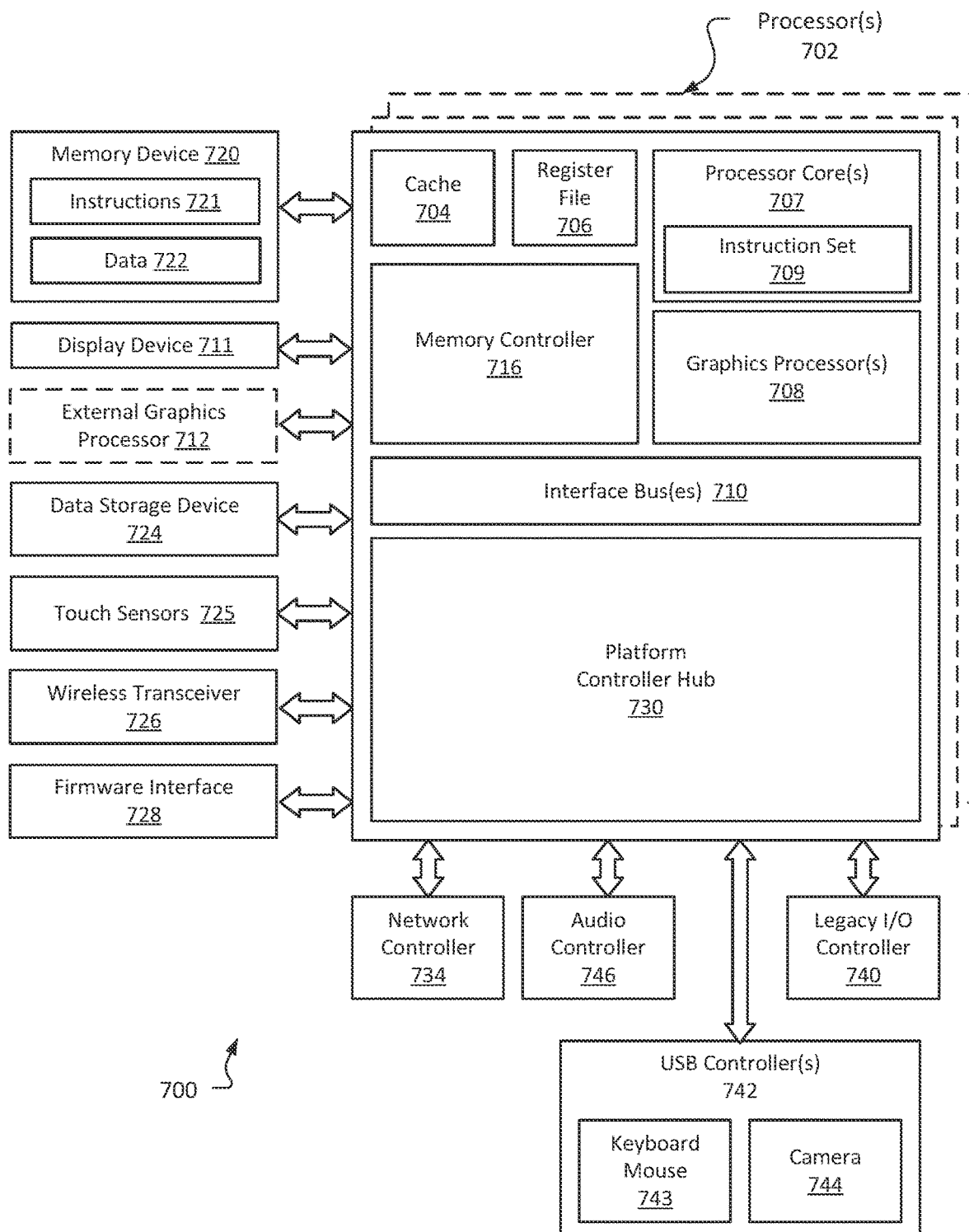
FIG. 7 illustrates an exemplary computing architecture for operations including smart runtime analysis and advisory operation, according to some embodiments.

FIG. 7 illustrates an embodiment of an exemplary computing architecture for operations including smart runtime analysis and advisory operation, according to some embodiments. In various embodiments as described above, a computing architecture 700 may comprise or be implemented as part of an electronic device.

In some embodiments, the computing architecture 700 may be representative, for example, of a computer system that implements one or more components of the operating environments described above. The computing architecture 700 may be utilized to provide smart runtime analysis and advisory operation, such as described in FIGS. 1-6.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections.

Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes one or more processors 702 and one or more graphics processors 708, and may be a single processor desktop system, a multiprocessor workstation system, or a server system having a large number of processors 702 or processor cores 707. In one embodiment, the system 700 is a processing platform incorporated within a system-on-a-chip (SoC or SOC) integrated circuit for use in mobile, handheld, or embedded devices.

An embodiment of system 700 can include, or be incorporated within, a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such as a Digital Signal Processor (DSP).

In some embodiments, the processor 702 includes cache memory 704. Depending on the architecture, the processor 702 can have a single internal cache or multiple levels of internal cache. In some embodiments, the cache memory 704 is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, non-volatile memory device such as flash memory device or phase-change memory device, or some other memory device having suitable performance to serve as process memory. Memory device 720 may further include non-volatile memory elements for storage of firmware. In one embodiment the memory device 720 can operate as system memory for the system 700, to store data 722 and instructions 721 for use when the one or more processors 702 execute an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device, or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724 (e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, Long Term Evolution (LTE), or 5G transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel high definition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices.

Figure 8:
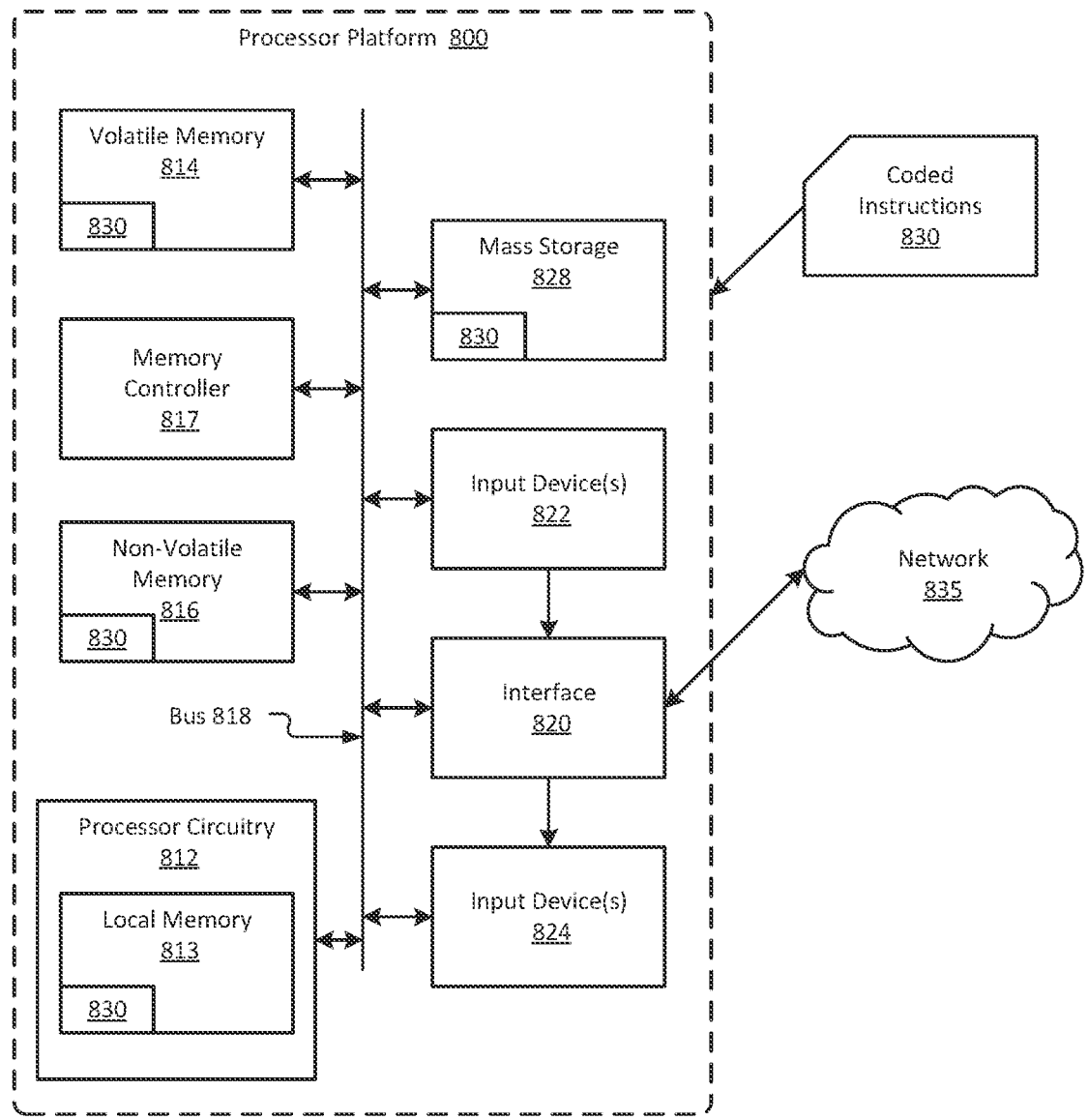
FIG. 8 is a block diagram of an example processor platform structured to execute the machine readable instructions or operations, according to some embodiments.

FIG. 8 is a block diagram of an example processor platform structured to execute the machine readable instructions or operations, according to some embodiments. As illustrated, a processor platform 800 can be, for example, a server, a personal computer, a workstation, a self-learning machine (e.g., a neural network), a mobile device (e.g., a cell phone, a smart phone, or a tablet), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), Dynamic Random Access Memory, and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 835. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 830, which may be implemented by the machine readable instructions of FIG. 6, may be stored in the mass storage device 828, in the volatile memory 814, in the non-volatile memory 816, and/or on a removable non-transitory computer readable storage medium such as a CD or DVD.

Figure 9:
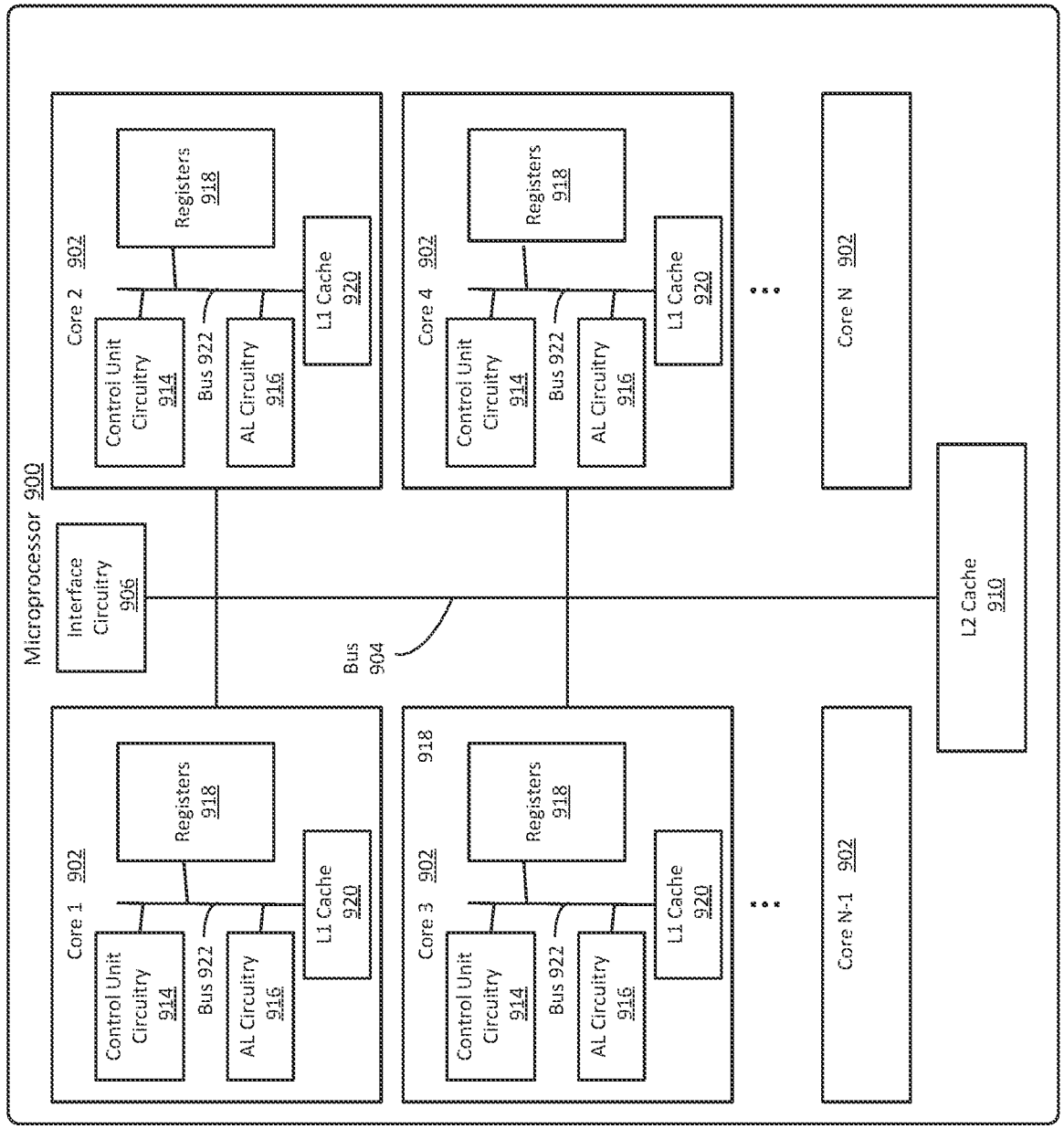
FIG. 9 is a block diagram of an example implementation of processor circuitry.

FIG. 9 is a block diagram of an example implementation of processor circuitry. In this example, the processor circuitry is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowchart of FIG. 6.

The cores 902 may communicate by an example bus 904. In some examples, the bus 904 may implement a communication bus to effectuate communication associated with one(s) of the cores 902. For example, the bus 904 may implement at least one of an Inter-Integrated Circuit (I2C) bus, a Serial Peripheral Interface (SPI) bus, a PCI bus, or a PCIe bus. Additionally or alternatively, the bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2) cache) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory. Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The bus 922 may implement at least one of an I2C bus, a SPI bus, a PCI bus, or a PCIe bus.

Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
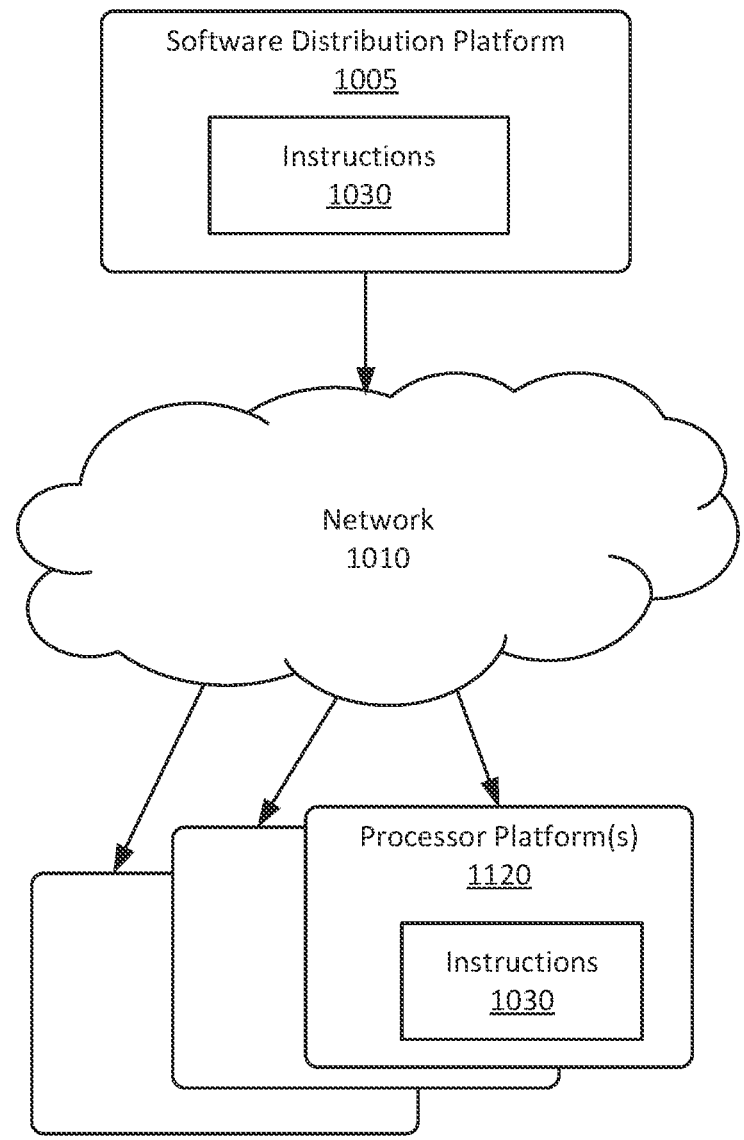
FIG. 10 is a block diagram illustrating an example software distribution platform.

FIG. 10 is a block diagram illustrating an example software distribution platform. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store machine readable instructions 1030.

The one or more servers of the example software distribution platform 1005 are in communication with a network 1010, which may correspond to any one or more of the Internet or other network. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1030 from the software distribution platform 1005 to processor platforms 1020. In some examples, one or more servers of the software distribution platform 1005 periodically offer, transmit, and/or force updates to the software to ensure improvements, patches, updates, etc., are distributed and applied to the software at the end user devices.

FIG. 11 is a block diagram illustrating an example system 1100 including an example GPU long instruction trace (GLIT) engine 1102 (e.g., trace engine 102 in FIG. 1) inserting example profiling instructions 1104A-1104C into a first example kernel 1106 to generate a second example kernel 1108. In this example, the first kernel 1106 (e.g., program code 106 in FIG. 1) is a GPU kernel to be executed by an example GPU 1110. In this example, the second kernel 1108 (e.g., instrumented program code 108 in FIG. 1) is an instrumented kernel (e.g., an instrumented GPU kernel). Alternatively, the first kernel 1106 may be any other type of kernel, such as a kernel to be executed by a neural network processor, a vision processing unit (VPU), etc.

The GPU 1110 may be implemented by a plurality of execution units arranged in slices (e.g., GPU slices). For example, the GPU 1110 may be implemented by a plurality of slices (e.g., 3 slices, 6 slices, 12 slices, etc.).

The GPU 1110 may execute the profiling instructions 1104A-1104C to generate example GLITs 1112 (e.g., traces 112 in FIG. 1). In this example, the GPU 1110 stores the GLITs 1112 in an example trace buffer 1114 (e.g., trace buffer 114 in FIG. 1). In this example, the trace buffer 1114 is stored in example memory 1116. The GLITs 1112 include GLIT data generated and/or otherwise outputted by the GPU 1110 in response to executing the profiling instructions 1104A-1104C included in the second kernel 1108, in response to being configured by the GLIT engine 1102 to generate the GLIT data, etc. For example, the GLITs 1112 may include GLIT data that implements and/or otherwise stores a snapshot of an architectural state of the GPU 1110. In some examples, the architectural state of the GPU 1110 can include first values stored in a GRF and/or one second values stored in an ARF associated with hardware thread(s). The GLIT engine 1102 may obtain and analyze the GLITs 1112 to better understand the execution of the second kernel 1108 by the GPU 1110. The GLIT engine 1102 may determine to adjust operation of the GPU 1110 based on an analysis of the GLITs 1112.

In some examples, the profiling instructions 1104A-1104C are profile routines (e.g., machine readable code, firmware and/or software profile routines, etc.), when executed by the GPU 1110, generate, determine, and/or store operational information such as, counters, hardware thread identifiers, register values, timestamps, etc., that can be used to better understand the execution of the second kernel 1108. For example, the profiling instructions 1104A-1104C may profile and/or otherwise characterize an execution of the second kernel 1108 by the GPU 1110.

In some examples, the profiling instructions 1104A-1104C are inserted at a first address (e.g., a first position) of a kernel (e.g., the beginning of the first kernel 1106) to initialize variables used for profiling. In some examples, the profiling instructions 1104A-1104C are inserted at locations intermediate the original instructions (e.g., between one(s) of the instructions of the first kernel 1106). In some examples, the profiling instructions 1104A-1104C are inserted at a second address (e.g., a second position) of the kernel (e.g., after the instructions from the first kernel 1106) and, when executed, cause the GPU 1110 to collect and/or otherwise store the metrics that are accessible by the GLIT engine 1102. In some examples, the profiling instructions 1104A-1104C are inserted at the end of the kernel (e.g., the first kernel 1106) to perform cleanup (e.g., freeing memory locations, etc.). However, such profiling instructions 1104A-1104C may additionally or alternatively be inserted at any location or position and in any order.

In the illustrated example of FIG. 11, an example CPU 1118 includes and/or otherwise implements the GLIT engine 1102, an example application 1120 (e.g., application 120 in FIG. 1), an example GPU driver 1122 (e.g., GPU driver 122 in FIG. 1), and an example GPU compiler 1124 (e.g., GPU compiler 124 in FIG. 1). The application 1120 is a software application that may be used to display an output from the GPU 1110 on one or more display devices when the GPU 1110 executes graphics-related tasks such as, for example, DirectX tasks, OpenGL tasks, pixel shader/shading tasks, vertex shader/shading tasks, etc. In some examples, the application 1120 may be implemented with one or more dynamic link libraries (DLLs). Additionally or alternatively, the application 1120 may be used to display and/or otherwise process outputs from the GPU 1110 when the GPU 1110 executes non-graphics related tasks. Additionally or alternatively, the application 1120 may be used by a GPU programmer to facilitate development of kernels/shaders in a high-level programming language such as, for example, HLSL, OpenCL, etc. For example, the application 1120 can be a profiling tool, such as a GPU profiling tool, a GPU analysis tool, etc.

In the illustrated example of FIG. 11, the application 1120 transmits tasks (e.g., computational tasks, graphics-related tasks, non-graphics related tasks, etc.) to the GPU driver 1122. In some examples, the GPU driver 1122 receives the tasks and instructs the GPU compiler 1124 to compile code associated with the tasks into a binary version (e.g., a binary format corresponding to binary code, binary instructions, machine readable instructions, etc.) to generate the first kernel 1106. The GPU compiler 1124 transmits the compiled binary version of the first kernel 1106 to the GPU driver 1122.

In some examples, the GLIT engine 1102 configures, programs, and/or otherwise controls the GPU 1110 to output data to the trace buffer 1114. For example, the GLIT engine 1102 may instruct the GPU driver 1122 to control the GPU 1110 to dump and/or otherwise output GLIT data, such as data and/or information described below in FIG. 12, at specific points of execution of a kernel, such as the first kernel 1106 or the second kernel 1108. In some examples, the GLIT engine 1102 may instruct the GPU driver 1122 to cause the GPU 1110 to output data associated with an instruction to be executed by the GPU 1110 to the trace buffer 1114. For example, the GLIT engine 1102 may cause the GPU 1110 to output data associated with a GPU instruction (e.g., an instruction included in the first kernel 1106, the second kernel 1108, etc.), a device access instruction (e.g., a memory access instruction, an instruction to be executed by the GPU 1110 that causes the GPU 1110 to access a sampler, a cache memory, etc.), etc.

In some examples, in response to the GPU 1110 executing the GPU instruction (e.g., an addition instruction, a move instruction, etc.) the GPU 1110 may output the GPU instruction, a first value of a register prior to executing the GPU instruction, a second value of the register after executing the GPU instruction, etc., to the trace buffer 1114. In some examples, in response to the GPU 1110 executing the device access instruction to cause the GPU 1110 to transmit a register value to a sampler, the GPU 1110 may output the device access instruction, the register value, etc., to the trace buffer 1114. Advantageously, in some such examples, the GLIT engine 1102 may control the GPU 1110 to output GLIT data to the trace buffer 1114 without instrumenting a kernel.

In some examples, the GLIT engine 1102 may control the GPU 1110 to output GLIT data to the trace buffer 1114 via binary instrumentation. For example, the GLIT engine 1102 may obtain the first kernel 1106 (e.g., in a binary format) from the GPU driver 1122. The GLIT engine 1102 may instrument the first kernel 1106 by inserting additional instructions, such as the profiling instructions 1104A-1104C, into the first kernel 1106. For example, the GLIT engine 1102 may modify the first kernel 1106 to create an instrumented GPU kernel, such as the second kernel 1108. That is, the GLIT engine 1102 creates the second kernel 1108 without executing any compilation of the first kernel 1106. In this manner, already-compiled GPU kernels can be instrumented and/or profiled. The second kernel 1108 is passed to the GPU 1110 via the memory 1116. For example, the GLIT engine 1102 can transmit the second kernel 1108 to the GPU driver 1122, which, in turn, may store the second kernel 1108 in the memory 1116 for retrieval by the GPU 1110.

In some examples, the GPU 1110 executes the profiling instructions 1104A-1104C to generate one or more of the GLITs 1112. In this example, the profiling instructions 1104A-1104C include a first example profiling instruction 1104 of "TRACE (0, TID)" inserted at a first position, where the first profiling instruction 1104A corresponds to generating a trace (e.g., one of the GLITs 1112). For example, the trace may refer to a sequence of data records that are written (e.g., dynamically written) into a memory buffer, such as the trace buffer 1114. In some examples, the first trace operation may be implemented with a read operation of a register (e.g., a hardware register) associated with a hardware thread and a store operation of a first value read from the register in a first variable. In such examples, the first trace operation may be implemented by generating a first one of the GLITs 1112 to include (i) the first value and/or (ii) a thread identifier (TID) associated with a hardware thread that accessed the register.

In the illustrated example of FIG. 11, the profiling instructions 1104A-1104C include a second example profiling instruction 1104B of "TRACE (1, TID)" inserted at a second position, where the second profiling instruction 1104B corresponds to a second trace operation. In some examples, the second trace operation may be implemented with a read operation of the register associated with the hardware thread and a store operation of a second value read from the register in a second variable. For example, the second value may be different from the first value of the first trace operation because the second value may be generated in response to the GPU 1110 executing the second kernel 1108. In such examples, the second trace operation may be implemented by generating a second one of the GLITs 1112 to include (i) the second value and/or (ii) the TID associated with the hardware thread that accessed the register.

In the illustrated example of FIG. 11, the profiling instructions 1104A-1104C include a third example profiling instruction 1104C of "TRACE (2, TID)" inserted at a third position, where the third profiling instruction 1104C corresponds to a third trace operation. In some examples, the third trace operation may be implemented with a read operation of the register associated with the hardware thread and a store operation of a third value read from the register in a third variable. For example, the third value may be different from the first value of the first trace operation and/or the second value of the second trace operation because the third value may be generated in response to the GPU 1110 executing the second kernel 1108. In such examples, the third trace operation may be implemented by generating a third one of the GLITs 1112 to include (i) the third value and/or (ii) the TID associated with the hardware thread that accessed the register.

In some examples, in response to executing the profiling instructions 1104A-1104C, and/or, more generally, the second kernel 1108, the GPU 1110 stores the GLITs 1112 in the trace buffer 1114. The trace buffer 1114 includes example records (e.g., data records) 1126 that may implement the GLITs 1112. For example, the records 1126 may implement GLIT data from the GPU 1110. In some examples, the records 1126, and/or, more generally, the GLITs 1112, may be encoded in a binary format based on an example GLIT format 1200 depicted in the illustrated example of FIG. 12.

Turning to FIG. 12, the GLIT format 1200 is depicted in plaintext and may be representative of, and/or otherwise correspond to, an example binary data format that may implement one(s) of the GLITs 1112 of FIG. 11. For example, the GLIT format 1200 may be used to implement an example binary file (e.g., an encoded binary file) that may be used by the GPU 1110 to store the GLIT(s) 1112. Alternatively, the GLIT format 1200 may be implemented using any other format.

In some examples, the CPU 1118 of FIG. 11 may obtain the records 1126 from the trace buffer 1114. In such examples, the CPU 1118 may generate one of the GLIT(s) 1112 to include one(s) of the records 1126 based on the GLIT format 1200. In some examples, the GLIT format 1200 may be implemented as a buffer in an encoded binary format that includes a plurality of example records (e.g., data records) 1202. For example, the records 1202 may implement the records 1126 of FIG. 11. In such examples, a first one of the records 1202 may correspond to a first one of the records 1126 of FIG. 11.

In some examples, the GLIT format 1200 may be generated in an atomic manner. For example, the GPU 1110 may sequentially generate the GLIT(s) 1112 in the GLIT format 1200 where a first one of the records 1202 is adjacent to a second one of the records 1202 and where the first one of the records 1202 is generated prior to the second one of the records 1202. Alternatively, the GLIT(s) 1112 having the GLIT format 1200 may be generated in a different manner than atomic, such as with a round-robin technique. The GPU 1110 may generate the records 1202 from a plurality of hardware threads.

In the illustrated example of FIG. 12, the GLIT format 1200 includes ones of the data records 1202 that are administrative in nature, such as a format version (VERSION) of the GLIT format 1200, a GEN model identifier (GEN MODEL ID), etc. For example, the GEN MODEL ID may refer to a particular architecture of the GPU 1110. In some examples, the CPU 1118 may determine a behavior, a specification, etc., of the GPU 1110 based on the GEN MODEL ID.

In the illustrated example of FIG. 12, the GLIT format 1200 includes decoded information of an instruction of a kernel, such as the second kernel 1108 of FIG. 11. For example, INST_DECODE_T INST0 may correspond to a decoded version of a first kernel instruction, such as INSTR1 DST, SRC1, SRC2 of FIG. 11 of the second kernel 1108. In some examples, INST_DECODE_T INST1 may correspond to a decoded version of a second kernel instruction, such as INSTR2 DST, SRC1, SRC2 of FIG. 11 of the second kernel 1108. In some examples, the decoded kernel instructions may implement decoded GLIT data that may be used by the GLIT engine 1102 to emulate and/or otherwise simulate execution of the instructions of the second kernel 1108 by the GPU 1110.

In the illustrated example of FIG. 12, the GLIT format 1200 includes example operating parameters such as a number of instructions (NUMBER OF INSTRUCTIONS) (e.g., a number of the instructions of the second kernel 1108), a number of relevant basic blocks (BBLs) (NUMBER OF RELEVANT BBLs), a number of SEND instructions (NUM OF SENDS), data associated with each of the SEND instructions (e.g., SEND0 DATA, SEND1 DATA, etc.), a maximum number of hardware threads (MAX NUM OF HW THREADS), a hardware thread identifier count (HW TID COUNT), etc. For example, a BBL may refer to a contiguous set of instructions having singular entry and exit points. In such examples, a kernel, such as the second kernel 1108, may be logically divided into one or more BBLs. Additionally or alternatively, the GLIT format 1200 may include operating parameters corresponding to a different type of instruction, such as a load instruction. For example, NUM OF SENDS may be replaced with a number of load instructions (NUM OF LOADS), SEND0 DATA may be replaced with LOAD0 DATA, SEND0 DESTINATION VALUES may be replaced with LOAD0 DESTINATION VALUES, etc., and/or a combination thereof.

In some examples, the GLIT format 1200 may be implemented to store data associated with a device access instruction, such as a SEND instruction, a READ SEND instruction, etc. For example, the GLIT format 1200 may include an offset value (OFFSET), a destination register (DST), a number of registers (NUM OF REGS), etc. In some examples, the GLIT format 1200 may be implemented to include header data (e.g., CE, DMASK, CR0.0, etc.) associated with device access instruction data (e.g., SEND destination value data, SEND0 DESTINATION VALUES, SEND1 DESTINATION VALUES, etc.), which may include a value of a first register of an ARF associated with the GPU 1110 (e.g., a CE register), a value of a second register of the ARF (e.g., a dispatch mask (DMASK) register), etc. Additionally or alternatively, there may be fewer or more records than the records 1202 depicted in FIG. 12. Advantageously, the GLIT engine 1102 may obtain the GLITs 1112 of FIG. 11 that are based on and/or otherwise have the GLIT format 1200, which may be used to improve profiling of the GPU 1110.

In the illustrated example of FIG. 12, a GLIT based on the GLIT format 1200 may store data associated with a plurality of hardware threads. For example, one of the GLIT(s) [112] 1112 based on the GLIT format 1200 may store first data corresponding to a first one of the threads, second data corresponding to a second one of the threads, etc. In this example, the first data may correspond to NUM OF BBL RECORDS, BBL ID, HEADER, SENDO DESTINATION VALUES, SEND1 DESTINATION VALUES, etc., which correspond to a first one of the threads having an identifier of TID 0. In this example, the second data may correspond to NUM OF BBL RECORDS, BBL ID, HEADER, SENDO DESTINATION VALUES, SEND1 DESTINATION VALUES, etc., which correspond to a second one of the threads having an identifier of TID 1. In this example, GLIT format 1200 may list the first data, the second data, etc., in sequential order. Alternatively, the GLIT format 1200 may list the first data, the second data, etc., in any other order and/or format.

Turning back to the illustrated example of FIG. 11, the GLIT engine 1102 retrieves (e.g., iteratively retrieves, periodically retrieves, etc.) the trace buffer 1114 from the memory 1116. In some examples, the GLIT engine 1102 determines one or more operating parameters associated with the second kernel 1108, and/or, more generally, the GPU 1110. For example, the GLIT engine 1102 may determine a GPU state, an execution time parameter, a busy time parameter, an idle time parameter, an occupancy time parameter, and/or a utilization parameter associated with the GPU 1110. In some examples, the GLIT engine 1102 adjusts operation of the GPU 110 based on the one or more operating parameters. For example, the GLIT engine 1102 may instruct the CPU 1118 to schedule an increased quantity of instructions to be performed by the GPU 1110, a decreased quantity of instructions to be performed by the GPU 1110, etc., based on the one or more operating parameters.

In the illustrated example of FIG. 11, the memory 1116 includes one or more kernels, such as the second kernel 1108, the trace buffer 1114, and example GPU data 1128 (e.g., GPU data 128 in FIG. 1). Alternatively, the memory 1116 may not store the one or more kernels. In some examples, the memory 1116 may be implemented by volatile memory, non-volatile memory (e.g., flash memory), etc., and/or a combination thereof. In some examples, the GPU data 1128 corresponds to data generated by the GPU 1110 in response to executing at least the second kernel 1108. For example, the GPU data 1128 can include graphics-related data, output information to a display device, etc.

FIG. 13 is a block diagram of an example implementation of a GLIT engine to improve operation of a GPU. In some examples, the GLIT engine 1102 of FIG. 11 instruments binary shaders/kernels prior to sending them to the GPU 1110 of FIG. 11. The GLIT engine 1102 can collect the GLITs 1112 of FIG. 11, which may be based on the GLIT format 1200 of FIG. 12, from the memory 1116 of FIG. 11. The GLIT engine 1102 can emulate operation of the GPU 1110 based on the records 1126 stored in the GLITs 1112. The GLIT engine 1102 can determine operating parameters associated with the GPU 1110, which may be used to determine improvement(s) to the operation of the GPU 1110, the CPU 1118, etc.

In the illustrated example of FIG. 13, the GLIT engine 1102 includes an example instruction generator 1310, an example trace extractor 1320, an example trace emulator 1330, an example trace analyzer 1340, an example hardware configurator 1350, and example storage 1360. In this example, the storage 1360 includes and/or otherwise stores example GLIT(s) 1370. In this example, at least one of the instruction generator 1310, the trace extractor 1320, the trace emulator 1330, the trace analyzer 1340, the hardware configurator 1350, and the storage 1360 may be in communication with one(s) of each other via an example bus 1380. For example, the bus 1380 may be implemented by an Inter-Integrated Circuit (I2C) bus, a Serial Peripheral Interface (SPI) bus, and/or a Peripheral Component Interconnect (PCI) bus.

In the illustrated example of FIG. 13, the GLIT engine 1102 includes the instruction generator 1310 to instrument kernels such as the first kernel 1106 of FIG. 11. For example, the instruction generator 1310 may access the first kernel 1106 (e.g., access the first kernel 1106 from memory included in the CPU 1118). The instruction generator 1310 may instrument the first kernel 1106 to generate the second kernel 1108 of FIG. 11. For example, the instruction generator 1310 may generate and insert binary code associated with the profiling instructions 1104A-1104C of FIG. 11 into the first kernel 1106 to generate the second kernel 1108. In some examples, the instruction generator 1310 provides and/or otherwise transmits the second kernel 1108 to the GPU driver 1122 of FIG. 11. In such examples, in response to obtaining the second kernel 1108 from the instruction generator 1310, the GPU driver 1122 may store the second kernel 1108 in the memory 1116 for later retrieval by the GPU 1110.

In some examples, the instruction generator 1310 implements means for inserting one or more profile routines, such as one or more of the profile instructions 1104A-1104C, in a kernel to be executed by one of the thread(s) 208 of the GPU 1110. In some examples, the means for inserting may be implemented by one or more analog or digital circuit(s), logic circuits, programmable processor(s), programmable controller(s), GPU(s), digital signal processor(s) (DSP(s)), application specific integrated circuit(s) (ASIC(s)), programmable logic device(s) (PLD(s)) and/or field programmable logic device(s) (FPLD(s)) (e.g., field programmable gate array(s) (FPGA(s))).

In some examples, the instruction generator 1310 implements means for generating binary code (e.g., binary instructions, machine readable instructions, etc.) based on the profiling instructions 1104A-1104C. In some examples, the instruction generator 1310 implements means for inserting the generated binary code into the first kernel 1106 at one or more places or positions within the first kernel 1106 to generate the second kernel 1108.

In the illustrated example of FIG. 13, the GLIT engine 1102 includes the trace extractor 1320 to retrieve and/or otherwise collect the GLITs 1112, and/or, more generally, the trace buffer 1114, from the memory 1116 of FIG. 11. In some examples, the trace extractor 1320 extracts the GLIT(s) 1112 from the trace buffer 1114 and/or extracting the records 1126 from the GLITs 1112. In some examples, the trace extractor 1320 processes the GLITs 1112 by traversing the GLITs 1112 from a first position (e.g., a beginning) of the GLIT format 1200 to a second position (e.g., an end) of the GLIT format 1200 and extracting the records 1126 along the way. For example, the trace extractor 1320 can extract, identify, and/or otherwise determine a first one of the records 1202 of FIG. 12, a second one of the records 1202, etc., from the GLIT format 1200 of FIG. 12.

In some examples, the trace extractor 1320 extracts the records 1126 from the GLITs 1112 by decoding the binary kernel representation of the GLIT 1112 to generate decoded binary data. In some examples, the trace extractor 1320 extracts instruction identifiers and/or opcodes from the decoded binary data. For example, the trace extractor 1320 can extract a SEND instruction, a READ SEND instruction, a branch instruction, etc., executed by the GPU 1110, and a first opcode corresponding to the SEND instruction, a second opcode corresponding to the branch instruction, etc. In some examples, the trace extractor 1320 sorts and/or otherwise groups one(s) of the records 1126 based on at least one of an instruction identifier or an opcode that correspond to the one(s) of the records 1126.

In some examples, the trace extractor 1320 stores an association of the opcode and an emulation routine (e.g., machine readable code, a firmware and/or software routine, etc.). For example, the trace extractor 1320 can identify that the first opcode corresponds to a first emulation routine. In such examples, the first emulation routine may be representative of an algorithm, machine readable instructions, etc., that, when executed, mimic and/or otherwise execute the same or substantially similar function as the SEND instruction that corresponds to the first opcode. In some examples, the trace extractor 1320 stores the records 1126, the instruction identifier, the opcode, the association, etc., in the storage 1360.

In some examples, the trace extractor 1320 implements means for identifying a first routine based on an identifier of a second routine executed by the GPU 1110, the first routine based on an emulation of the second routine. In some examples, the trace extractor 1320 implements means for extracting the GLITs 1112 from the trace buffer 1114 and/or extracting the records 1126 from the GLITs 1112. In some examples, the means for identifying and/or the means for extracting may be implemented by one or more analog or digital circuit(s), logic circuits, programmable processor(s), programmable controller(s), GPU(s), DSP(s), ASIC(s), PLD(s), and/or FPLD(s).

In the illustrated example of FIG. 13, the trace emulator 1330 emulates and/or otherwise replays the GLITs 1112 of FIG. 11 to effectuate analysis of the operation of the GPU 1110. For example, the trace emulator 1330 may replay execution of the second kernel 1108 by the GPU 1110 based on data stored in the GLITs 1112. In some examples, the trace emulator 1330 may replay one or more executions of the second kernel 1108 by respective ones of the threads based on the data stored in the GLITs 1112 that correspond to the respective ones of the threads. In some examples, the trace emulator 1330 executes emulation routines that simulate routines executed by the GPU 1110. For example, the trace emulator 1330 can retrieve one(s) of the records 1126 from the GLITs 1112 and enter the retrieved one(s) of the records 1126 as arguments into a first emulation routine that may simulate execution of an instruction (e.g., an addition instruction, a subtraction instruction, a multiplication instruction, etc.) by the GPU 1110. In such examples, the retrieved one(s) of the records 1126 can be the states of the GPU 1110, such as values of registers of the ARF, the GRF, etc., associated with a thread of interest to process of the GPU 1110.

In some examples, the trace emulator 1330 instruments the emulation routines with callback routine(s) (e.g., callback instruction(s)) to facilitate analysis by the application 1120 of FIG. 11, a developer or user associated with the CPU 1118 of FIG. 11, etc. For example, the trace emulator 1330 can include high-level language (HLL) instructions, which may be representative of machine readable instructions, into the emulation routines. In such examples, in response to the trace emulator 1330 executing the instrumented emulation routines, the trace emulator 1330 can invoke an API to provide and/or otherwise transmit output data in connection with execution of the instrumented emulation routines to an upper level analysis construct, such as the application 1120. Advantageously, the trace emulator 1330 may instrument and execute emulation routines to generate data and provide the data to a GPU profiling tool, which may be used to identify improvement(s) to operation of the GPU 1110, the CPU 1118, etc., and/or a combination thereof.

In some examples, the trace emulator 1330 implements means for executing a first routine to determine a first value of a GPU state of the GPU, the first routine having (i) a first argument associated with the second routine and (ii) a second argument corresponding to a second value of the GPU state prior to executing the first routine. In some examples, the GPU state is a state of a first register in an ARF associated with a hardware thread of the GPU or a second register of a GRF of the hardware thread. In some examples, the identifier may be a first identifier extracted from an encoded binary file, and the means for executing is to determine the first value, the second value, and a hardware thread identifier from a long instruction trace generated by the hardware thread in response to an execution of the one or more profile routines by the hardware thread. In such examples, the first value can correspond to a GPU register value after an execution of the kernel by the hardware thread, the second value can correspond to the GPU register value prior to the execution of the kernel by the hardware thread, and the hardware thread identifier can identify the hardware thread.

In some examples, the means for executing is to determine one or more first register values of one or more respective first registers of a GRF of the GPU, determine one or more second register values of one or more respective second registers of an ARF of the GPU, and/or store the one or more first register values, the one or more second register values, one or more third register values, and a device access instruction (e.g., a SEND instruction, a READ SEND instruction, etc.) in a long instruction trace, such as a GLIT. In some examples, the one or more third registers can correspond to one or more respective destination registers associated with the device access instruction.

In some examples, the means for executing is to insert a first callback routine in an instrumented routine before an emulation routine, and the first callback routine may invoke a first application programming interface (API) to provide the second GPU state to an application. In some examples, the means for executing is to insert a second callback routine in the instrumented routine after the emulation routine, and the second callback routine may invoke the first API or a second API to provide the first GPU state to the application.

In some examples, the means for executing may be implemented by one or more analog or digital circuit(s), logic circuits, programmable processor(s), programmable controller(s), GPU(s), DSP(s), ASIC(s), PLD(s), and/or FPLD(s).

In the illustrated example of FIG. 13, the GLIT engine 1102 includes the trace analyzer 1340 determine one or more operating parameters associated with the GPU 1110 of FIG. 11. In some examples, the trace analyzer 1340 implements means for determining a GPU state, an execution time parameter, a busy time parameter, an idle time parameter, an occupancy time parameter, and/or a utilization parameter associated with the GPU 1110. In some examples, the trace analyzer 1340 determines the one or more operating parameters based on an emulation of operation of the GPU 1110 by replaying the GLIT 1112. For example, the trace analyzer 1340 may determine a GPU state for a first one of the threads by identifying a change in a register value of the GRF corresponding to the first one of the threads in response to executing the second kernel 1108. In some examples, the trace analyzer 1340 can calculate an execution time parameter for the first one of the threads by determining a quantity of time that the first one of threads needed to execute the second kernel 1108. In some examples, the trace analyzer 1340 can determine a utilization parameter for the first one of the threads 208 by calculating a ratio of a busy time of the first one of the threads 208 and a total amount of time for a time period of interest.

In some examples, the trace analyzer 1340 determines aggregate operating parameters that are based on two or more of the threads. For example, the trace analyzer 1340 can calculate an aggregate execution time parameter, an aggregate utilization parameter, etc. In such examples, the trace analyzer 1340 can determine the aggregate utilization parameter by calculating a ratio of one or more busy ones of the threads and a total quantity of the threads for a time duration or time period of interest.

In some examples, trace analyzer 1340 implements means for determining an operating parameter of a GPU based on a GPU state. For example, the means for determining may determine a utilization of the GPU based on the first GPU state. In some examples, the means for determining may be implemented by one or more analog or digital circuit(s), logic circuits, programmable processor(s), programmable controller(s), GPU(s), DSP(s), ASIC(s), PLD(s), and/or FPLD(s).

In the illustrated example of FIG. 13, the GLIT engine 1102 includes the hardware configurator 1350 to adjust operation of the GPU 1110 and/or the CPU 1118 based on the GLIT 1112, the one or more operating parameters associated with the GLIT 1112, etc. In some examples, the hardware configurator 1350 delivers, provides, and/or otherwise communicates the one or more operating parameters to the application 1120 of FIG. 11. For example, the hardware configurator 1350 can report and/or otherwise communicate a GPU state, a hardware thread utilization, an execution unit utilization, etc., associated with the GPU 1110 to developers (e.g., software developers, processor designers, GPU engineers, etc.) with a performance analysis tool (e.g., a GPU profiling tool), a graphical user interface (GUI) included in the performance analysis tool, etc. In such examples, the developers may improve their software by improving, for example, load balance of computational tasks, provisioning different data distribution among hardware threads, execution units, etc., of the GPU 1110, etc.

In some examples, the hardware configurator 1350 can invoke hardware, software, firmware, and/or any combination of hardware, software, and/or firmware (e.g., the GPU driver 1122, the CPU 1118, etc.) to improve operation of the GPU 1110. For example, the hardware configurator 1350 can generate and transmit an instruction (e.g., a command, one or more machine readable instructions, etc.) to the GPU driver 1122, the CPU 1118, etc., of FIG. 11. In response to receiving and/or otherwise executing the instruction, the GPU driver 1122, the CPU 1118, etc., may be invoked to determine whether to adjust an operation of the GPU 1110. For example, the GPU driver 1122, and/or, more generally, the CPU 1118, may be called to adjust scheduling of computational tasks, jobs, workloads, etc., to be executed by the GPU 1110 based on the one or more operating parameters.

In some examples, the hardware configurator 1350 invokes and/or otherwise instructs the GPU driver 1122 to analyze one or more operating parameters based on the GLIT(s) 1112. For example, the GPU driver 1122, and/or, more generally, the CPU 1118, may compare an operating parameter to an operating parameter threshold (e.g., a GPU state threshold, an execution time threshold, a busy time threshold, an idle time threshold, a utilization threshold, etc.). For example, when invoked, the GPU driver 1122 and/or, more generally, the CPU 1118, may determine that a utilization of the GPU 1110 is 95% corresponding to the GPU 1110 being busy 95% of a measured time interval. The GPU driver 1122 may compare the utilization of 95% to a utilization threshold of 80% and determine that the GPU 1110 should not accept more computational tasks based on the utilization satisfying the utilization threshold (e.g., the utilization is greater than the utilization threshold). As used herein, a job or a workload may refer to a set of one or more computational tasks to be executed by one or more hardware threads, such as the threads 208 of FIG. 2.

In some examples, when invoked by the hardware configurator 1350, the GPU driver 1122, and/or, more generally, the CPU 1118, may determine that a utilization of the GPU 1110 is 40%. The GPU driver 1122 may compare the utilization of 40% to the utilization threshold of 80% and determine that the GPU 1110 has available bandwidth to execute more computational tasks. For example, the GPU driver 1122 may determine that the utilization of 40% does not satisfy the utilization threshold of 80%. In response to determining that the utilization of the GPU 1110 does not satisfy the utilization threshold, the GPU driver 1122 may adjust or modify a schedule of resources to facilitate tasks to be executed by the GPU 1110. For example, the GPU driver 1122 may increase a quantity of computational tasks that the GPU 1110 is currently executing and/or will be executing based on the utilization parameter, which may be determined based on the GLIT(s) 1112 of FIG. 11.

In some examples, the hardware configurator 1350 implements means for improving and/or otherwise optimizing resource scheduling (e.g., hardware scheduling, memory allocation, etc.) by the CPU 1118. For example, developers may develop and/or improve hardware scheduling functions or mechanisms by analyzing the one or more operating parameters associated with the GPU 1110.

In some examples, the hardware configurator 1350 implements means for controlling workload of the GPU based on the first value of the GPU state. In some examples, the means for controlling is to, in response to determining that an operating parameter (e.g., a busy time, a utilization, etc.) does not satisfy a threshold, cause at least one of an adjustment to a routine (e.g., one or more instructions included in the second kernel 1108) or an increased number of computational tasks to be executed by the GPU 1110 to control the workload of the GPU 1110. In some examples, the means for controlling may be implemented by one or more analog or digital circuit(s), logic circuits, programmable processor(s), programmable controller(s), GPU(s), DSP(s), ASIC(s), PLD(s), and/or FPLD(s).

In the illustrated example of FIG. 13, the GLIT engine 1102 includes the storage 1360 to record data, such as the GLIT(s) 1370. For example, the GLIT(s) 1370 may include one or more of the GLIT(s) 1112 of FIG. 11. In such examples, the GLIT(s) 1370 may be stored in the storage 1360 in an encoded binary format, such as the GLIT format 1200 of FIG. 12. In some examples, the storage 1360 records and/or otherwise stores one(s) of the records 1126 of FIG. 11, which may include instruction identifiers, opcodes, and/or data associated with one(s) of the instruction identifiers and/or one(s) of the opcode(s), one or more emulation routines, one or more associations between one(s) of the one or more emulation routines and one(s) of the instruction identifiers and/or one(s) of the opcodes, etc., and/or a combination thereof. In some examples, the storage 1360 stores instrumented versions of the emulation routines, such as emulation routines that may include callback routines to invoke data transfer via one or more APIs.

The storage 1360 of this example may be implemented by a volatile memory (e.g., a Synchronous Dynamic Random Access Memory (SDRAM), Dynamic Random Access Memory (DRAM), etc.) and/or a non-volatile memory (e.g., flash memory). The storage 1360 may additionally or alternatively be implemented by one or more double data rate (DDR) memories, such as DDR, DDR2, DDR3, DDR4, mobile DDR (mDDR), etc. The storage 1360 may additionally or alternatively be implemented by one or more mass storage devices such as hard disk drive(s) (HDD(s)), compact disk (CD) drive(s), digital versatile disk (DVD) drive(s), solid-state disk (SSD) drive(s), etc. While in the illustrated example the storage 1360 is illustrated as a single storage, the storage 1360 may be implemented by any number (e.g., at least one storage disc or device) and/or type(s) of storage. Furthermore, the data stored in the storage 1360 may be in any data format such as, for example, binary data, comma delimited data, tab delimited data, structured query language (SQL) structures, etc.

While an example manner of implementing the GLIT engine 1102 of FIG. 11 is illustrated in FIG. 13, one or more of the elements, processes and/or devices illustrated in FIG. 13 may be combined, divided, re-arranged, omitted, eliminated and/or implemented in any other way. Further, the example instruction generator 1310, the example trace extractor 1320, the example trace emulator 1330, the example trace analyzer 1340, the example hardware configurator 1350, the example storage 1360, the example GLIT(s) 1370, and/or, more generally, the example GLIT engine 1102 of FIG. 11 may be implemented by hardware, software, firmware and/or any combination of hardware, software and/or firmware. Thus, for example, any of the example instruction generator 1310, the example trace extractor 1320, the example trace emulator 1330, the example trace analyzer 1340, the example hardware configurator 1350, the example storage 1360, the example GLIT(s) 1370 and/or, more generally, the example GLIT engine 1102 could be implemented by one or more analog or digital circuit(s), logic circuits, programmable processor(s), programmable controller(s), GPU(s), digital signal processor(s) (DSP(s)), application specific integrated circuit(s) (ASIC(s)), programmable logic device(s) (PLD(s)) and/or field programmable logic device(s) (FPLD(s)) (e.g., field programmable gate array(s) (FPGA(s))). When reading any of the apparatus or system claims of this patent to cover a purely software and/or firmware implementation, at least one of the example instruction generator 1310, the example trace extractor 1320, the example trace emulator 1330, the example trace analyzer 1340, the example hardware configurator 1350, the example storage 1360, and/or the example GLIT(s) 1370 is/are hereby expressly defined to include a non-transitory computer readable storage device or storage disk such as a memory, a DVD, a CD, a Blu-ray disk, etc., including the software and/or firmware. Further still, the example GLIT engine 1102 of FIG. 11 may include one or more elements, processes and/or devices in addition to, or instead of, those illustrated in FIG. 13, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

The following Examples pertain to certain embodiments:

In Example 1, a computer-readable storage medium includes instructions to cause at least one processor to receive graphics processing unit (GPU) program code for tracing, the program code including a plurality of instructions; analyze the plurality of instructions to identify instructions of the program code that are events requiring synchronization; instrument each of the identified events to generate instrumented program code; execute the instrumented program code on a plurality of hardware threads of the GPU to generate trace data; and emulate the trace data utilizing an emulator on a plurality of hardware traces of a central processing unit (CPU), including replaying the identified events according to an order of occurrence of the identified events.

In Example 2, the identified events include one or more of a code dispatch, a code end-of-thread event, a read or write access to global memory, a read or write access to shared local memory, an exit from a waiting state, or a memory fence instruction.

In Example 3, instrumenting each of the identified events includes: dividing the program code into a sequence of basic blocks; and inserting a trace instruction into each basic block of the sequence of basic blocks that contains an event.

In Example 4, instrumenting each of the identified events further includes: inserting a dynamic instruction count relating to an original instruction in each basic block where a tracing instruction is added.

In Example 5, the execution of the program code on the plurality of hardware traces of the GPU includes, upon a hardware trace reaching an identified event in the program code, reserving a next available slot of a trace buffer and storing event data for the event into the reserved slot of the trace buffer.

In Example 6, emulating the trace data includes, for a next instruction that is an identified event to be emulated by a hardware thread of the CPU: determining whether the identified event is a current event for emulation according to the stored event data in the trace buffer; if the identified event is the current event for emulation, emulating the instruction on the hardware thread of the CPU; and if the identified event is not the current event for emulation, switching emulation to another hardware thread of the CPU.

In Example 7, the program code is a kernel or a shader.

In Example 8, the plurality of hardware traces of the GPU is greater in number than the plurality of hardware traces of the CPU.

In Example 9, a method includes receiving graphics processing unit (GPU) program code for tracing, the program code including a plurality of instructions; analyzing the plurality of instructions to identify instructions of the program code that are events requiring synchronization; instrumenting each of the identified events to generate instrumented program code; executing the instrumented program code on a plurality of hardware threads of the GPU to generate trace data; and emulating the trace data utilizing an emulator on a plurality of hardware traces of a central processing unit (CPU), including replaying the identified events according to an order of occurrence of the identified events.

In Example 10, the identified events include one or more of a code dispatch, a code end-of-thread event, a read or write access to global memory, a read or write access to shared local memory, an exit from a waiting state, or a memory fence instruction.

In Example 11, instrumenting each of the identified events includes: dividing the program code into a sequence of basic blocks; and inserting a trace instruction into each basic block of the sequence of basic blocks that contains an event.

In Example 12, instrumenting each of the identified events further includes inserting a dynamic instruction count relating to an original instruction in each basic block where a tracing instruction is added.

In Example 13, the execution of the program code on the plurality of hardware traces of the GPU includes, upon a hardware trace reaching an identified event in the program code, reserving a next available slot of a trace buffer and storing event data for the event into the reserved slot of the trace buffer.

In Example 14, emulating the trace data includes, for a next instruction that is an identified event to be emulated by a hardware thread of the CPU: determining whether the identified event is a current event for emulation according to the stored event data in the trace buffer; if the identified event is the current event for emulation, emulating the instruction on the hardware thread of the CPU; and if the identified event is not the current event for emulation, switching emulation to another hardware thread of the CPU.

In Example 15, an apparatus includes one or more processors including a central processing unit (CPU) having a plurality of hardware threads and a graphics processing unit (GPU) having a plurality of hardware threads; and a memory for storage of data including program data for tracing, wherein the one or more processors are to: receive GPU program code for tracing, the program code including a plurality of instructions; analyze the plurality of instructions to identify instructions of the program code that are events requiring synchronization; instrument each of the identified events to generate instrumented program code; execute the instrumented program code on the plurality of hardware threads of the GPU to generate trace data; and emulate the trace data utilizing an emulator on the plurality of hardware traces of the CPU, including replaying the identified events according to an order of occurrence of the identified events.

In Example 16, instrumenting each of the identified events includes the one or more processors to: divide the program code into a sequence of basic blocks; and insert a trace instruction into each basic block of the sequence of basic blocks that contains an event.

In Example 17, instrumenting each of the identified events further includes the one or more processors to insert a dynamic instruction count relating to an original instruction in each basic block where a tracing instruction is added.

In Example 18, the execution of the program code on the plurality of hardware traces of the GPU includes, upon a hardware trace reaching an identified event in the program code, reserving a next available slot of a trace buffer and storing event data for the event into the reserved slot of the trace buffer.

In Example 19, emulating the trace data includes, for a next instruction that is an identified event to be emulated by a hardware thread of the CPU, the one or more processors to determine whether the identified event is a current event for emulation according to the stored event data in the trace buffer; if the identified event is the current event for emulation, emulate the instruction on the hardware thread of the CPU; and if the identified event is not the current event for emulation, switch emulation to another hardware thread of the CPU.

In Example 20, the plurality of hardware traces of the GPU is greater in number than the plurality of hardware traces of the CPU.

In Example 21, an apparatus including means for receiving graphics processing unit (GPU) program code for tracing, the program code including a plurality of instructions; means for analyzing the plurality of instructions to identify instructions of the program code that are events requiring synchronization; means for instrumenting each of the identified events to generate instrumented program code; means for executing the instrumented program code on a plurality of hardware threads of the GPU to generate trace data; and means for emulating the trace data utilizing an emulator on a plurality of hardware traces of a central processing unit (CPU), including replaying the identified events according to an order of occurrence of the identified events.

In Example 22, the identified events include one or more of a code dispatch, a code end-of-thread event, a read or write access to global memory, a read or write access to shared local memory, an exit from a waiting state, or a memory fence instruction.

In Example 23, the means for instrumenting each of the identified events includes means for dividing the program code into a sequence of basic blocks; and means for inserting a trace instruction into each basic block of the sequence of basic blocks that contains an event.

In Example 24, the means for instrumenting each of the identified events further includes means for inserting a dynamic instruction count relating to an original instruction in each basic block where a tracing instruction is added.

In Example 25, the execution of the program code on the plurality of hardware traces of the GPU includes, upon a hardware trace reaching an identified event in the program code, reserving a next available slot of a trace buffer and storing event data for the event into the reserved slot of the trace buffer.

In Example 26, the means for emulating the trace data includes, for a next instruction that is an identified event to be emulated by a hardware thread of the CPU: determining whether the identified event is a current event for emulation according to the stored event data in the trace buffer; if the identified event is the current event for emulation, emulating the instruction on the hardware thread of the CPU; and if the identified event is not the current event for emulation, switching emulation to another hardware thread of the CPU.

In Example 27, the program code is a kernel or a shader.

In Example 28, the plurality of hardware traces of the GPU is greater in number than the plurality of hardware traces of the CPU.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. At least one non-transitory computer-readable storage medium comprising instructions for execution by at least one processor that, when executed, cause the at least one processor to:
   receive graphics processing unit (GPU) program code for tracing, the program code including a plurality of instructions;
   analyze the plurality of instructions to identify instructions of the program code that are events requiring synchronization;
   instrument each of the identified events to generate instrumented program code;
   execute the instrumented program code on a plurality of hardware threads of the GPU to generate trace data; and
   emulate the trace data utilizing an emulator on a plurality of hardware traces of a central processing unit (CPU), including replaying the identified events according to an order of occurrence of the identified events.

2. The at least one non-transitory computer-readable storage medium of claim 1, wherein the identified events include one or more of a code dispatch, a code end-of-thread event, a read or write access to global memory, a read or write access to shared local memory, an exit from a waiting state, or a memory fence instruction.

3. The at least non-transitory one computer-readable storage medium of claim 1, wherein instrumenting each of the identified events includes:
   dividing the program code into a sequence of basic blocks; and
   inserting a trace instruction into each basic block of the sequence of basic blocks that contains an event.

4. The at least one non-transitory computer-readable storage medium of claim 3, wherein instrumenting each of the identified events further includes:
   inserting a dynamic instruction count relating to an original instruction in each basic block where a tracing instruction is added.

5. The at least one non-transitory computer-readable storage medium of claim 1, wherein the execution of the program code on the plurality of hardware traces of the GPU includes, upon a hardware trace reaching an identified event in the program code, reserving a next available slot of a trace buffer and storing event data for the event into the reserved slot of the trace buffer.

6. The at least one non-transitory computer-readable storage medium of claim 5, wherein emulating the trace data includes, for a next instruction that is an identified event to be emulated by a hardware thread of the CPU:
   determining whether the identified event is a current event for emulation according to the stored event data in the trace buffer;
   if the identified event is the current event for emulation, emulating the instruction on the hardware thread of the CPU; and
   if the identified event is not the current event for emulation, switching emulation to another hardware thread of the CPU.

7. The at least one non-transitory computer-readable storage medium of claim 1, wherein the program code is a kernel or a shader.

8. The at least one non-transitory computer-readable storage medium of claim 1, wherein the plurality of hardware traces of the GPU is greater in number than the plurality of hardware traces of the CPU.

9. A method comprising:
receiving graphics processing unit (GPU) program code for tracing, the program code including a plurality of instructions;
analyzing the plurality of instructions to identify instructions of the program code that are events requiring synchronization;
instrumenting each of the identified events to generate instrumented program code;
executing the instrumented program code on a plurality of hardware threads of the GPU to generate trace data; and
emulating the trace data utilizing an emulator on a plurality of hardware traces of a central processing unit (CPU), including replaying the identified events according to an order of occurrence of the identified events.

10. The method of claim 9, wherein the identified events include one or more of a code dispatch, a code end-of-thread event, a read or write access to global memory, a read or write access to shared local memory, an exit from a waiting state, or a memory fence instruction.

11. The method of claim 9, wherein instrumenting each of the identified events includes:
dividing the program code into a sequence of basic blocks; and
inserting a trace instruction into each basic block of the sequence of basic blocks that contains an event.

12. The method of claim 11, wherein instrumenting each of the identified events further includes:
inserting a dynamic instruction count relating to an original instruction in each basic block where a tracing instruction is added.

13. The method of claim 9, wherein the execution of the program code on the plurality of hardware traces of the GPU includes, upon a hardware trace reaching an identified event in the program code, reserving a next available slot of a trace buffer and storing event data for the event into the reserved slot of the trace buffer.

14. The method of claim 13, wherein emulating the trace data includes, for a next instruction that is an identified event to be emulated by a hardware thread of the CPU:
determining whether the identified event is a current event for emulation according to the stored event data in the trace buffer;
if the identified event is the current event for emulation, emulating the instruction on the hardware thread of the CPU; and
if the identified event is not the current event for emulation, switching emulation to another hardware thread of the CPU.

15. An apparatus comprising:
one or more processors including a central processing unit (CPU) having a plurality of hardware threads and a graphics processing unit (GPU) having a plurality of hardware threads;
a memory for storage of data including program data for tracing;
wherein the one or more processors are to:
receive GPU program code for tracing, the program code including a plurality of instructions;
analyze the plurality of instructions to identify instructions of the program code that are events requiring synchronization;
instrument each of the identified events to generate instrumented program code;
execute the instrumented program code on the plurality of hardware threads of the GPU to generate trace data; and
emulate the trace data utilizing an emulator on the plurality of hardware traces of the CPU, including replaying the identified events according to an order of occurrence of the identified events.

16. The apparatus of claim 15, wherein instrumenting each of the identified events includes the one or more processors to:
divide the program code into a sequence of basic blocks; and
insert a trace instruction into each basic block of the sequence of basic blocks that contains an event.

17. The apparatus of claim 16, wherein instrumenting each of the identified events further includes the one or more processors to:
insert a dynamic instruction count relating to an original instruction in each basic block where a tracing instruction is added.

18. The apparatus of claim 15, wherein the execution of the program code on the plurality of hardware traces of the GPU includes, upon a hardware trace reaching an identified event in the program code, reserving a next available slot of a trace buffer and storing event data for the event into the reserved slot of the trace buffer.

19. The apparatus of claim 18, wherein emulating the trace data includes, for a next instruction that is an identified event to be emulated by a hardware thread of the CPU, the one or more processors to:
determine whether the identified event is a current event for emulation according to the stored event data in the trace buffer;
if the identified event is the current event for emulation, emulate the instruction on the hardware thread of the CPU; and
if the identified event is not the current event for emulation, switch emulation to another hardware thread of the CPU.

20. The apparatus of claim 15, wherein the plurality of hardware traces of the GPU is greater in number than the plurality of hardware traces of the CPU.

* * * * *